US010641604B1

(12) United States Patent
Nathan et al.

(10) Patent No.: US 10,641,604 B1
(45) Date of Patent: *May 5, 2020

(54) METHOD OF TRACKING MOVEABLE OBJECTS BY COMBINING DATA OBTAINED FROM MULTIPLE SENSOR TYPES

(71) Applicant: Intellivision Technologies Corp., San Jose, CA (US)

(72) Inventors: Vaidhi Nathan, San Jose, CA (US); Chandan Gope, Derwood, MD (US); Lev Afraimovich, Nizhniy Novgorod (RU); Sergey Soprykin, Nizhniy Novgorod (RU); Roman Kholodov Valerievich, Nizhny Novgorod (RU)

(73) Assignee: Intellivision Technologies Corp, San Jose, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 15/606,675

(22) Filed: May 26, 2017

Related U.S. Application Data

(63) Continuation of application No. 14/311,269, filed on Jun. 21, 2014, now Pat. No. 9,664,510.
(Continued)

(51) Int. Cl.
*G01B 21/00* (2006.01)
*G06F 17/18* (2006.01)
(Continued)

(52) U.S. Cl.
CPC ............ *G01B 21/00* (2013.01); *G06F 17/18* (2013.01); *G06K 9/00771* (2013.01);
(Continued)

(58) Field of Classification Search
CPC .. G06G 10/08; G06K 9/00771; G06K 9/6293; G01B 21/00; G06F 17/18
See application file for complete search history.

(56) References Cited

U.S. PATENT DOCUMENTS 5,434,775 A * 7/1995 Sims ................. G06K 17/0022
705/7.12
5,623,413 A * 4/1997 Matheson ........... B61L 27/0016
701/117
(Continued)

FOREIGN PATENT DOCUMENTS

WO WO-2014205425 A1 12/2014

OTHER PUBLICATIONS

Eltoum, Ibrahim et al., "Velocity based Tracking and Localization System using Smartphones with GPS and GPRS/3G", Aug. 2013, International Journal of Computer Applications, vol. 76, No. 11, pp. 47-51.*
(Continued)

*Primary Examiner* — Mischita L Henson
(74) *Attorney, Agent, or Firm* — Schwegman Lundberg & Woessner, P.A.

(57) ABSTRACT

Method of tracking moveable objects (typically tagged objects that are moved by actors e.g. people, vehicles) by combining and analyzing data obtained from multiple types of sensors, such as video cameras, RFID tag readers, GPS sensors, and WiFi transceivers. Objects may be tagged by RFID tags, NFC tags, bar codes, or even tagged by visual appearance. The system operates in near real-time, and compensates for errors in sensor readings and missing sensor data by modeling object and actor movement according to a plurality of possible paths, weighting data from some sensors higher than others according to estimates of sensor accuracy, and weighing the probability of certain paths according to various other rules and penalty cost parameters. The system can maintain a comprehensive database which can be queried as to which actors associate with which objects, and vice versa. Other data pertaining to object location and association can also be obtained.

19 Claims, 13 Drawing Sheets

Related U.S. Application Data

(60) Provisional application No. 61/838,280, filed on Jun. 22, 2013.

(51) Int. Cl.
  *G06K 9/00* (2006.01)
  *G06K 9/62* (2006.01)
  *G06Q 10/08* (2012.01)
  *G06K 17/00* (2006.01)

(52) U.S. Cl.
  CPC ........... *G06K 9/6293* (2013.01); *G06Q 10/08* (2013.01); *G06K 2017/0045* (2013.01)

(56) References Cited

U.S. PATENT DOCUMENTS

| | | | | |
|---|---|---|---|---|
| 9,664,510 B2 | 5/2017 | Nathan et al. | | |
| 2001/0030625 A1* | 10/2001 | Doles | ................ | G01S 5/02 342/387 |
| 2004/0036623 A1* | 2/2004 | Chung | ................ | G06K 7/10336 340/8.1 |
| 2006/0091206 A1* | 5/2006 | Olsen | ................ | G06Q 10/08 235/384 |
| 2006/0187026 A1* | 8/2006 | Kochis | ................ | G06Q 10/08 340/539.13 |
| 2006/0187028 A1* | 8/2006 | Kiang | ................ | G01C 21/165 340/539.13 |
| 2006/0267731 A1* | 11/2006 | Chen | ................ | G06Q 10/08 340/10.1 |
| 2007/0182818 A1* | 8/2007 | Buehler | ................ | G08B 13/19602 348/143 |
| 2007/0262861 A1* | 11/2007 | Anderson | ................ | G06Q 10/025 340/539.13 |
| 2009/0216775 A1* | 8/2009 | Ratliff | ................ | H04W 4/029 |
| 2009/0315717 A1* | 12/2009 | Soomro | ................ | G06K 7/0008 340/572.1 |
| 2010/0002082 A1* | 1/2010 | Buehler | ................ | G08B 13/19645 348/159 |
| 2011/0205022 A1* | 8/2011 | Cavallaro | ................ | A63B 24/0021 340/8.1 |
| 2012/0303571 A1 | 11/2012 | Faynberg et al. | | |
| 2013/0079039 A1 | 3/2013 | Heikkilae et al. | | |
| 2014/0379296 A1 | 12/2014 | Nathan et al. | | |

OTHER PUBLICATIONS

Paul et al., "GPS and Bluetooth Based Object Tracking System", Jan. 2016,International Journal of Advanced Research in Computer and Communication Engineering, vol. 5, Issue 1, pp. 233-235.*

Wenhua Zhao et al., "Estimation-based variable neighborhood search approach for a probabilistic routing problem with deadlines in wireless sensor and actor networks", Apr. 1, 2013, 10th IEEE International Conference on Networking, Sensing and Control, pp. 436-441.*

"U.S. Appl. No. 14/311,269, Examiner Interview Summary dated Mar. 1, 2017", 3 pgs.

"U.S. Appl. No. 14/311,269, Non Final Office Action dated Jan. 31, 2017", 15 pgs.

"U.S. Appl. No. 14/311,269, Notice of Allowance dated Apr. 20, 2017", 10 pgs.

"U.S. Appl. No. 14/311,269, Response filed Apr. 11, 2017 to Non Final Office Action dated Jan. 31, 2017", 10 pgs.

"International Application Serial No. PCT/US2014/043539, International Preliminary Report on Patentability dated Jan. 5, 2017", 9 pgs.

"International Application Serial No. PCT/US2014/043539, International Search Report dated Nov. 25, 2014", 2 pgs.

"International Application Serial No. PCT/US2014/043539, Written Opinion dated Nov. 25, 2014", 7 pgs.

* cited by examiner

Time K=1

Time K=2

Time K=3

Time K=4

METHOD OF TRACKING MOVEABLE OBJECTS BY COMBINING DATA OBTAINED FROM MULTIPLE SENSOR TYPES

CROSS REFERENCE TO RELATED APPLICATIONS

This application is a continuation of U.S. patent application Ser. No. 14/311,269, "METHOD OF TRACKING MOVEABLE OBJECTS BY COMBINING DATA OBTAINED FROM MULTIPLE SENSOR TYPES", filed Jun. 21, 2014, now U.S. Pat. No. 9,664,510 issued May 30, 2017; application Ser. No. 14/311,269 claimed the priority benefit of U.S. provisional application 61/838,280, "Data Fusion of Object Location & tracks from Multiple Sensor", inventors Chandan Gope and Vaidhi Nathan, filed Jun. 22, 2013; the entire contents of all applications are incorporated herein by reference.

BACKGROUND OF THE INVENTION

Field of the Invention

This invention is in the field of automated object tracking, in particular in systems and methods for tracking tagged products and materials for various retail, transportation, healthcare, and manufacturing purposes.

Description of the Related Art

Over the last few decades, a significant amount of progress has been made in automated systems and methods to track various labeled objects. This art is useful in many industries. For example, in the retail sectors, many products are now labeled with tags such as bar code tags, or radio frequency identification (RFID) tags. When customers bring their various products to the checkout counter, various sensors, such as bar code readers and RFID tag readers, scan the products, and assign the products to the particular customer's bill. This insures that the customer's bill is accurate, is useful for marketing research, and allows the merchant's computers to automatically monitor changes in the merchant's product inventory.

Such object tagging methods are also popular in many other areas as well, such as manufacturing, where parts and subassemblies for various goods may be tagged and tracked for manufacturing and transportation purposes; and healthcare, where patients themselves may be individually labeled with bar codes to help confirm that they are receiving proper treatment.

Over the past few decades, there have been advances in other types of sensor technology as well. For example it is now common in many industries to install various types of video monitoring sensors for security purposes. For example, in a retail setting, such video sensors can detect shoplifters in action, and the like.

Additionally, as technology has advanced, it is now common for nearly all members of the public to carry various handheld portable computerized devices, such as Smartphones, that often establish various local and long distance wireless links with various local transceivers (e.g. local WiFi transceivers, local Bluetooth® transceivers, cell phone towers, and the like. Indeed, use of various Smartphone apps that trigger when a Smartphone user is near a particular merchant location, and inform the user that the merchant may be offering various coupons of interest, are also now common.

Although various types of sensors and advanced computer technologies are now common in the modern world, nonetheless the problem remains that information obtained by these different sensors often is at least initially stored in different bins or silos. Such information is seldom combined on a real-time basis, at least by automated methods.

BRIEF SUMMARY OF THE INVENTION

The invention is based, in part, on the insight that if improved computerized methods of automatically and quickly (e.g. on a real-time or near real-time basis) of combining or "fusing" data from different types of sensors could be developed, then the resulting information so obtained could provide many valuable insights in many areas, including retail sales, manufacturing, health care, and the like.

The invention is also based, in part, on the insight that the real-time tracking of objects is of great interest to a wide variety of industries and applications. With the advent of multiple sensor modalities (such as Video cameras, RFID tag readers, GPS location sensors, and the like.), it is desirable to rapidly combine these pieces of information to provide an accurate and robust description of the object of interest. It would be further useful to devise various general methods and strategies towards this end that could be used with many different types of sensors.

In some embodiments, the invention may be a system and method of automatically estimating locations of a plurality of different objects (often these objects will be tagged with RFID tags and the like) that are capable of being moved by a plurality of different actors. The invention generally operates by using a set of first sensors (such as various video cameras and the like) and at least one processor to track and store in computer memory at least the approximate paths over time various actors (actor path data). The invention also uses a set of second sensors (which may be RFID tag sensors) to also track and store in computer memory at least the approximate locations over time of the various objects (object location over time data). Other types of sensors may also be used, but in general, the first sensors and the second sensors are typically different types of sensors.

Here the problem is that often at least one set of sensors, such as the RFID sensors, will have some errors associated with them so that the sensors are often only able to approximately locate the various objects at any given time.

The invention can overcome this type of problem, and also obtain additional valuable data, by using its processor (s), the actor path data, and the object location over time to determine if and how the location of a given object and the path of a given actor correlate over time. The invention can also be configured to determine with some degree of probability that there is at least one tentative association between a particular given object and given actor. The invention can provide more realistic tracking information because it can be further configured to understand that the probability that an object, once moved by an actor, remains associated with the actor, is less than or equal to 1, and that scenarios where an object would be associated with a different actor should be assigned one or more penalty cost parameters depending on the specifics of the monitoring situation at hand.

For example, if small children are being monitored, the probability of an object being associated with different small children actors may be fairly high, but if the actors are robots not otherwise configured to exchange objects, then the probability of an object being transferred from one robot to another robot is low, and penalty cost factors can be adjusted according to each situation.

The invention's computerized system and method will then generally use the actor path data, the object location over time data, calculations regarding at least one tentative association probability between a given object and a given actor, and various penalty cost parameters for various useful purposes. For example, the system can determine the probable location of a given object at one or more times, or alternatively determine the probability that a given object is or has been associated with a given actor at one or more times.

In a preferred embodiment, the invention will often combine data from various sensors on a real-time or near-real time basis, such as at a combining and analysis rate of at least 1 set of sensor combinations and analysis every 100 seconds, preferably at a rate of around 1 sensor combination and analysis every second, and optimally at near video refresh rates of 30 sensor combinations and analysis rates per second, or even higher.

BRIEF DESCRIPTION OF THE DRAWINGS

FIG. 11 shows how the invention can reduce the complexity of some of the analytical algorithms (here a multi-index axial assignment problem) by reducing this problem to a more computationally manageable min-cost flow problem.

DETAILED DESCRIPTION OF THE INVENTION

Figure 1:
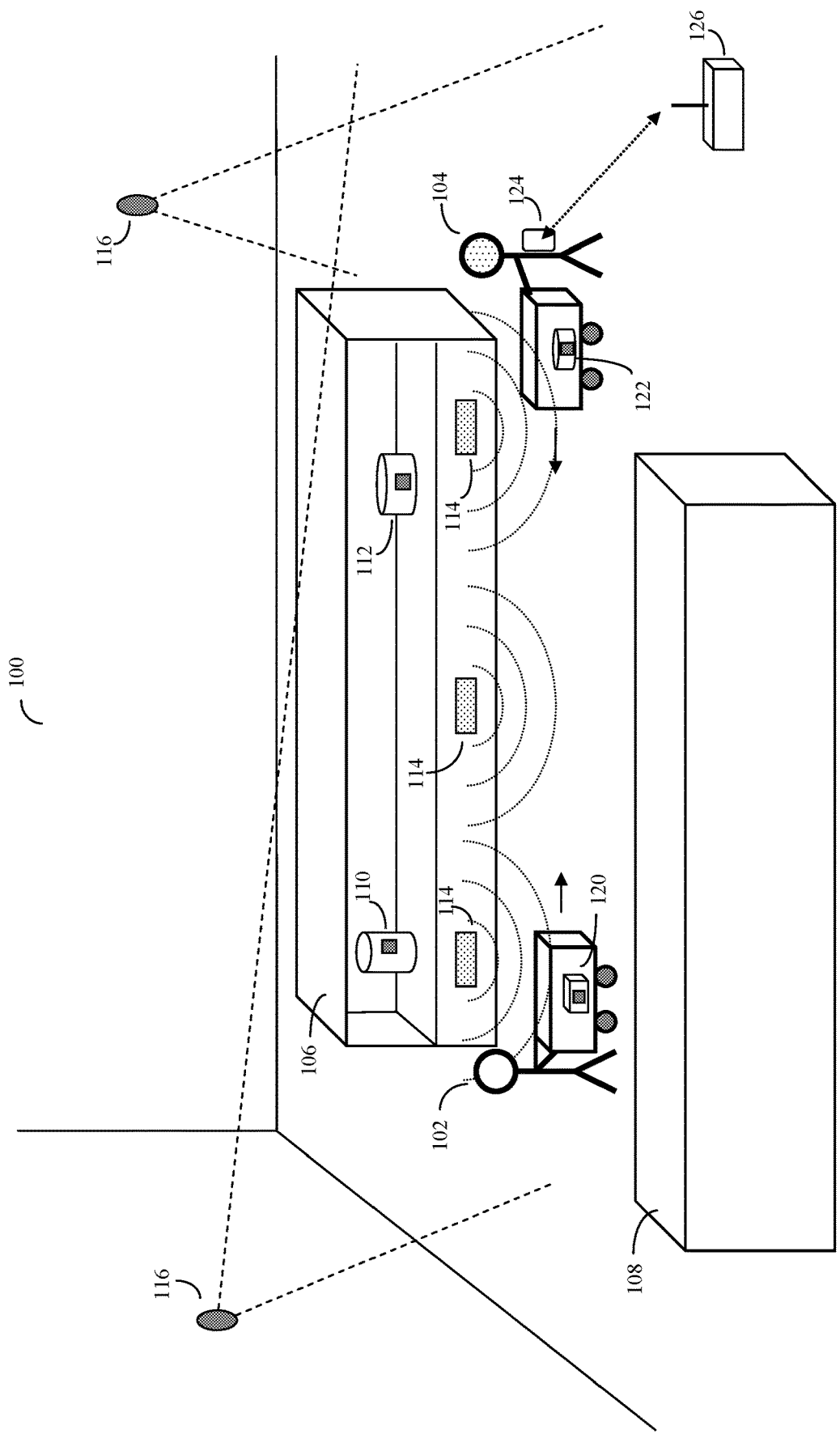
FIG. 1 shows how the invention may automatically integrate data from various video sensors and RFID tag sensors to monitor actors (here customers) purchasing objects (here RFID tagged products) in a retail store setting.

Types of objects and actors: as defined herein, an "object" is generally assumed to be a moveable item (where tracking information is desired) that does not usually move by itself. An "actor" is generally assumed to be an entity, such as a person, vehicle, robot, and the like that is capable of independent movement, and is also capable of moving one or more objects. The invention can also obtain tracking information on actors as well.

Thus the invention is aimed to capturing and locating and tracking the following types of objects such as products, access control tags or badges, valuables, merchandise or other inventory. These objects can often be moved by various actors such as people, vehicles (e. cars, boats, ships, airplanes and the like), shopping carts, and moving autonomous objects (e.g. robots).

The invention will often operate using multiple types of sensors. These sensor types can often include visual sensors such as cameras, and various types of wireless devices such as mobile phones (e.g. Smartphones), and other devices which are often equipped with WiFi, Bluetooth® transceivers, radio frequency identification tags (RFID tags), near field communication tags (NFC tags), and/or can be located by various methods such as triangulation of cell phone signals (e.g. 3G/4G locators), Global Positioning System (GPS) receivers, and the like.

Within each sensor type, the system can use at least one sensor. For example, if the system uses a video camera type sensor, the system may in fact operate using any number of video cameras. Similarly if a sensor type is an RFID tag reader, the system may in fact operate using any number of RFID tag readers, and so on.

The invention can be used for many applications, locations, and industries, including tracking inventory at retail stores, malls, and other shopping locations. The invention can also be used for tracking inventory and other logistics tracking at warehouses, product distribution centers, airports, shipyards, train stations, trucking depots, and other transportation centers. The invention may also be used to monitor patients, staff, and supplies at hospitals and other healthcare locations. The invention also has many manufacturing and industrial applications as well.

Types of Detection/Monitoring: in some embodiments, the invention may employ at least three different types of monitoring or analyzing objects, including passive, active, and semi-active methods. In the passive method, the actor or object is automatically and passively determined and located and tracked, but no active (i.e. human input, active object transponder) coordination is required. By contrast in the active method, either the actor or object can actively participate or coordinate with the system by, for example, providing the actor or object's information or location. In the third semi-active case, the actor may indirectly provide its location or position to the system by interacting with the environment or otherwise doing a suitable task. In some embodiments, all three above methods can be used in any combination during a tracking session.

Types of data and data acquisition and association: in some embodiments, the system will use its various sensors to obtain various types of data pertaining to the objects or actors that it is tracking. This can include the object or actor's current position (location), the time that this information is captured, the identification (ID) or other unique object identification code (e.g. RFID ID code, NFC ID code, object serial number, and the like). If the actor is a person or other object carrying a Smartphone or other WiFi equipped portable computerized device, the system may also track the actor using the device's WiFi MAC address or other ID.

Additionally other information, including information pertaining to the sensor(s) used will often also be obtained, including the sensor ID codes and/or type of sensor used to collect the data, location of sensor (e.g. maps showing where the sensor is located and how it is oriented, often as a one-time set of configuration data), and estimated confidence values for the errors in the sensor output such as the sensor signal error or estimated error in object position/location.

Derived extra/secondary data (from primary data): in some embodiments, the system will then use the basic primary information, discussed above, to then derive various types of additional information. This additional information can include information such as object (or actor) change in position (e.g. distance traveled), speed, direction and velocity, acceleration, visual features, which the system can determine by using various types of math formulas or image processing/computer vision algorithms. The system can also determine what confidence limits should be placed on this information (e.g. errors in position and speed determinations, confidence limits and the like.

FIG. 1 shows an overview of how data from various sensors (here video cameras and RFID tag readers) can be used to monitor the interaction between human shoppers (actors) and various RFID tagged products (objects) in a retail store environment.

Here there are two "actors", shopper (102) and shopper (104) moving their shopping carts between various merchandise shelves (106), (108) of a store (100). Shelf (106) has two "objects"; here RFID tagged merchandise (110) and (112). The shelf also has various RFID tag reader type sensors (114) distributed at various locations, with partial overlap between the various RFID sensors. On the store walls, two video camera sensors (116) monitor the shoppers, and there is partial overlap between the two cameras. Shopper (102) already has object (merchandise) (120) in his cart, and shopper (104) has a different object (merchandise) (122) in his cart. As the two shoppers walk through the store, their location and velocity (speed, direction of movement) can be monitored by the system, and the approximate position of the various RFID tagged objects of merchandise can also be tracked by the various RFID tag sensors.

In this example, shopper (104) is also carrying a smartphone device (124) that is running an app designed to communicate information about shopper (104) to the store's WiFi transceiver (126). Thus, using FIG. 1 as a specific example, the invention may be a method of automatically estimating locations of a plurality of different RFID tagged objects (such as 110, 112, 120, 122) that are capable of being moved by a plurality of different actors (here shoppers 102 and 104). This method generally operates by using a set of first sensors (e.g. video cameras 116) and at least one processor (shown in FIG. 2) to track and store in computer memory at least the approximate paths over time of the various actors (102, 104). The method also uses a set of second sensors (here RFID tag sensors 114) to also track and store in computer memory at least the approximate locations over time of the various objects (object location over time data) (110, 112, 120, 122). Other types of sensors may also be used (such WiFi transceiver 126), ether as a third set of sensors, or in place of one of the previously discussed first and second set of sensors.

In any event, generally the first sensors and the second sensors are typically different types of sensors (e.g. sensors 116 are video sensors while sensors 114 are RFID tag reader sensors). Note that sensor (126) is a WiFi transceiver configured to receive information from a Smartphone (124) carried by actor (104), and that in some embodiments, sensor (126) might be considered to be a first or second sensor, while in other embodiments sensor (126) might be considered to be a third type of sensor.

Here the problem is that often at least one set of sensors, such as the RFID sensors (114), will have some errors (e.g. distance to tag errors) associated with them so that the sensors are often only able to approximately locate the spatial location of various objects (110, 112, 120, 122) at any given time. In FIG. 1, the position determination errors of the RFID sensors (114) are shown by the broad arcs drawn about sensor (114).

As previously discussed, despite the fact that the RFID tag sensors (114) can only approximately determine the location of the various RFID tagged objects (110, 112, 120, 122), the system can overcome this type of problem, and also obtain still more valuable data, by using its processor(s), the actor path data (see arrows for actors 102 and 104), and the object location over time to determine if and how the a given object and the path of a given actor correlate over time. The system is thus configured to be capable of determining with some degree of probability that there is at least one tentative association between a particular given object and given actor.

In this example, even if actors (102) and (104) never pick up objects (110) and (112), nonetheless object (120) in actor (102)'s shopping cart remains associated with actor (102), while object (122) in actor (104)'s shopping cart remains associated with actor (104).

The system can provide more realistic tracking information because it can be further configured to understand that there is often a good probability that an object, once moved by an actor, continues to remain associated with that actor. This association does not always happen, however, so this probability is usually less than or equal to1. However it usually happens, and the system can be instructed to expect this by telling it that when it analyzes the sensor data, there is a penalty cost parameter associated with changing the assignment of objects from one actor to another.

Thus scenarios where an object would be associated with a different actor should be assigned one or more penalty cost parameters depending on the specifics of the monitoring situation at hand. More specifically, object (120) once moved by actor (102) will usually stay with actor (102), while object (122) once moved by actor (104) will usually stay with actor (104). It is possible but generally unlikely that actor (102) and (104) will exchange objects (120) and (122) when their paths cross, although it does happen on occasion.

For example, in this retail setting (100), if at least one of the actors (102) or (104) is a small child, and the other actor is a parent, then the possibility that an object may be transferred from one actor to another may be fairly high. If on the other hand, however, both actors are adults from different families, then the probability of an object being transferred between actors is fairly low.

Here the more information that the system knows about the actors, the better it can estimate such probabilities. For example if both actors (102) and (104) are carrying smartphones (124), and the store WiFi sensor (126) reads information from the smartphones and concludes that actors (102) and (104) are unrelated adults, then the system will assume that the probability of objects being transferred between actors will be low. The system can thus use the best available information to adjust various penalty cost factors for objects "jumping" between actors according to the situation at hand.

As before, the computer system (shown in FIG. 2) will then generally use the actor (102, 104) path data, the object location over time data, calculations regarding least one tentative association probability between a given object and a given actor, and various penalty cost parameters for various useful purposes. For example, the system can determine the probable location of a given object at one or more times, or alternatively determine the probability that a given object is or has been associated with a given actor at one or more times. Here for example, the system will probably conclude that actor (102) intends to purchase object (120), while actor (104) intends to purchase object (122).

Note in this example both actors (102, 104) were further tagged with their respective unique ID wireless devices (Smartphone 124) that they were carrying. Here the system further using a set of third wireless device sensors (WiFi transceiver 126) and at least one processor (the computer system shown in FIG. 2) to associate these unique IDs with the actors (102, 104). The computer system further used its at least one processor to determine the association probability between objects (120) and (122) and the unique ID labeled actors at one or more times. Here this was done by changing the penalty cost factor for objects jumping from one actor to the other depending on the age and relationships of the actors.

Note also that in the above example, the system used information obtained from the Smartphone (124) worn by the actors to determine the actor's identity and demographic information. Here for example, the system may look up the unique ID obtained from the Smartphone, and correlate it with a database entry that cross lists the actor's unique ID with the actor's identity and demographic information. Additionally or alternatively, the user may have activated a Smartphone app, entered in the information, and the app may have directly supplied this data to the system via WiFi sensor (126) (alternatively the Smartphone may use a Bluetooth® transceiver and the store may have its own Bluetooth transceiver). In either event, once this information has been obtained, the system can use this information for various purposes, such as correlating the association between a given object and the identity or demographic information pertaining to the actor, and store this information in the system's computer database for later use.

Figure 2:
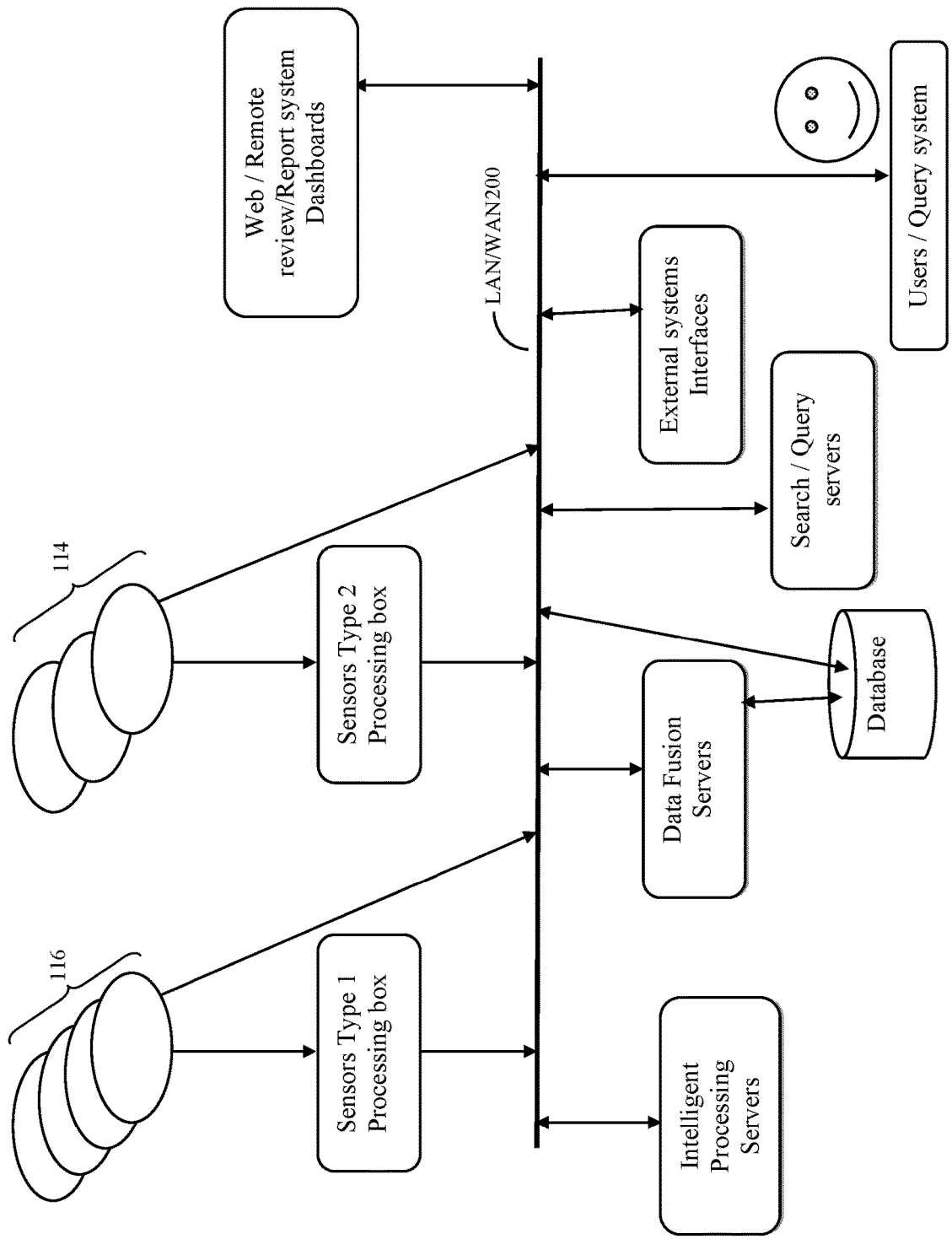
FIG. 2 shows a diagram of how data from the various sensors can be transported by various computer networks (e.g. local area networks and the like) and handled by various system computer processors such as servers.

FIG. 2 shows a diagram of how data from the various sensors (such as 116 and 114) can be transported by various computer networks (e.g. local area networks and the like) (200) and handled by various system computer processors such as the various servers shown in FIG. 2. Typically the invention's methods are software implemented methods that can be implemented using either standard or customized computer processors (often using the popular x86, ARM, MIPS, or other type processors) and can be implemented using standard software building blocks running on standard operating systems such as Windows, Linux, Unix, and the like. Additionally, standard XML and web services protocols may also be used as desired.

Although dumb sensors (e.g. sensors not equipped with their own processors and onboard software) may be used, in some embodiments, intelligent smart sensors may be used that use their own onboard processors to process raw sensor data, and output processed sensor data. Here use of such smart sensors can be useful because it can then reduce the overall need to transport large amounts of raw data over computer networks, as well as reduce the demand on other system computer processors.

In some embodiments, such as exemplified by FIG. 1, the system will be configured so that the same areas are covered by multiple sensors. Here, a certain amount of sensor redundancy can be useful, because in addition to having backup when any given sensor fails, having the same actor or object reported at the same time with multiple sensors can be used to minimize measurement errors and produce a more accurate data. System software can also be designed to cope with occasional sensor-drop offs and other errors by making certain extrapolations or predictions regarding the movement of various objects and actors. These algorithms will be discussed in more detail shortly.

Figure 3:
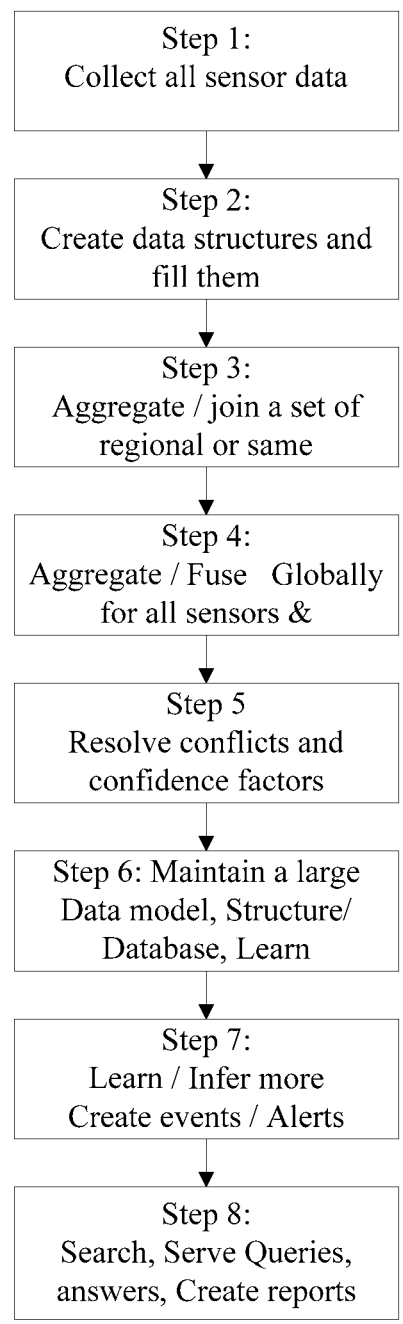
FIG. 3 shows an overall flow chart showing steps 1 through 8 of the invention's data analysis methods.

FIG. 3 shows a flow chart showing steps 1 through 8 of the invention's data analysis methods, which to at least some extent can be implemented by the data fusion servers shown in FIG. 2, as well as on other servers and processors as desired. To summarize, according to the invention's methods, the system will typically operate to perform various types of data analytics on the position and velocity (e.g. speed, direction) of various objects and actors. The system will generally keep track of sensor measurement error, and will analyze the sensor data accordingly. Thus by building in this error into the various calculations, the system can determine the relative probability or confidence interval that a particular object or actor is in a particular location and moving with a particular velocity. This helps the system merge data obtained from multiple sensors to produce an accurate estimate of the true position and velocity of the various objects and actors that it is tracking.

Step 1: in step 1, the system will collect all sensor data. Here this data collection will be described on a per sensor type basis. If the sensor type is a video camera such as (116), the data will typically be analyzed using various computer vision video analytic techniques. Here both object and actor data can include object and actor size, location, color, texture, and other appearance characteristics that can be used as an "object signature" to help the system track the object. The object and actor's position, speed and direction of movement can be determined, as well as the amount of time that each object and actor spends in each location. Additionally, situations where multiple objects or actors interact or come close together at the same time can also be assessed. This data is usually time stamped, and often will be collected at a rate between 1-30 video frames per second (1-30 Hz).

Similarly if the system is using GPS sensor data to track an object or actor, the GPS sensor will typically collect and return data such as the object ID code, GPS latitude and longitude (and often also altitude) information, and time that this data is recorded. This data will often be collected at a rate between about once every five seconds (e.g. 0.2 Hz) to about 5 times per second (5 Hz).

If the system is using RFID tag reader type sensors (such as 114) to track an RFID tagged object or actor (or NFC tag readers to read an NFC tagged object), the RFID tag reader (or NFC tag reader) will also typically return information such as the object's identification code, location, speed, if the object is moving or non-moving, and even more complex data such as data useful to estimate the distance and angle to the object, and likely error ranges as well.

If the system is using WiFi transceivers to, for example, determine the Media Access Control (MAC ID) of a WiFi device (such as a Smartphone carried by an actor that is a person), or otherwise use WiFi to download data from the device software such as a Smartphone app, then the system's WiFi sensors will typically return data such as the device's (e.g. Smartphone's) ID or WiFi ID, as well as other information useful for determining the location, direction of movement of the device, speed of the device, distance from the WiFi sensor(s) to the device, angle(s) between the WiFi sensor(s) and the device, and likely error ranges as well.

Error rates, Data frequency and data confidence/probability factors: Note that any sensor will have some amount of error and imprecision. In a preferred embodiment, the system will capture (or otherwise acquire) and utilize the expected or observed sensor errors in its various determinations. These sensor errors can be used for various types of confidence and probably measures which will be described in more detail shortly. For example: knowing the signal strength or measuring error, the system can compute the approximate error rate in the measurement or position error or confidence.

Step 2: in the second step of the process, the system can store the sensor data in computer memory (e.g. RAM, Flash, hard disk, computer database) in the form of various types of data structures.

The system can use various types of different data models and data structures. These can include actor (e.g. person, vehicle, transportation device) based data structures that can include the actor identification (ID), location, speed, direction of movement, name, time data was collected, and various confidence factors such as anticipated errors in the sensor data. Additionally, typically each object (e.g. item, product) may also have its own object based data structures that can similarly include this type of information as well.

At the sensor level, the system may acquire and/or store information pertaining to some or all of the objects and information each sensor sees, as well as information calculated or tracked from this sensor data. As previously discussed, generally there will be at least one sensor from each different sensor type used in the system. Here the different sensors can be grouped by either sensor type or sensor location, and the system can be configured to correlate or join all objects and actors seen in a given region. Additionally, as needed the system can acquire, store, and aggregate information for all regions where sensors are placed, and as needed aggregate the various objects and actors for subsequent analysis.

These data structures will typically updated at a rate that will often be based on the various frequencies discussed above. This update rate can vary, however, based computation needs and final display/query/reporting needs.

Step 3: In the third step of the process, information from sensors of the same type or location (region) can be aggregated. Here, data obtained from multiple sensors (of same or diff types) in a region or whole area based on the sensor can be joined. In particular, in step 3, sensor data are joined to help identify one or more objects or actors, as well as to validate the object or actor's information, position, speed, etc.

For example, here video feeds from five different video cameras can be automatically analyzed by the system using various computer vision techniques, and this data can be used for purposes of to join and correlate all the people moving in a mall or store. Generally each of the sensors can be used to report the objects or actors (people). In particular, various objects and actors can be correlated by position and location and joined together (e.g. understood by the system to represent a single object or actor moving through space and time).

Similarly information from other types of sensors, such as RFID sensors, can also be aggregated and analyzed as well using the methods described herein. Regardless of sensor used, the main result of this third step is to gather a collection of information of similar types of sensors, or sensors located in the same location (region), and join or resolve this information on a smaller and more local level.

Step 4: In step 4, the process of step 3 is essentially repeated on a larger scale. That is, all data for an entire region or area can be aggregated and analyzed. Here all sensor data are joined and fused. Information is correlated and aggregated and object and actor (e.g. people and vehicle) information are resolved, confirmed and validated and aggregated. Step 4 can also join data obtained from multiple different sensor types. For example, data obtained video camera sensors, GPS sensors, and RFID tag reader sensors can be aggregated and joined and fused at this step in order to create a model of what the various objects and actors are actually doing. Here various methods of joining and fusing can, for example, be done according to the various "Fusion/Aggregation/Correlation/Analytics Algorithm" type methods described below.

Note however that problems can often occur because some data may conflict with other data. How such conflicts can be handled will be discussed in more detail shortly.

Step 5: resolving conflicts and various other incorrect information or assumptions. This step can either be joined with step 4 above, or alternatively it can be executed separately. Here the system looks at various conflicts and potential conflicts, resolves them. The problem is that since often the system is attempting to use multiple sensors and multiple sensor types to analyze interactions between many different objects and actors (e.g. people and vehicles), there are often likely to be various differences in data measurement, confidence and data collection that need to be reconciled. For example, sensors may report that what appears to be the same actor (person) may be simultaneously appearing in two different locations? Which is the correct location-?Here various methods can be used to resolve conflicts and ambiguities.

For example, using at least one processor and software operating as described below, errors can be reduced by taking multiple sensor observations and readings, and either taking a majority consensus, or alternatively weight the data from sensors known to be more accurate higher than the data from sensors known to be less accurate. To do this, the system may optionally analyze the various amount of noise or error (e.g. confidence factors) the various sensors, and give higher error sensors a lower weight or priority. Alternatively or additionally the system can also be programmed to weigh the data from sensors closer to the object or actor of interest higher than the readings from sensors further away from the object or actor of interest. The system can also use machine learning algorithms to examine how past data was analyzed, how accurate the results were, and adjust itself accordingly. As yet another alternative, the system can also assume that the object or actor (e.g. person) of interest is likely to be located within a range of locations. This range can be an "approximate estimate" or bubble/circle of possible locations generally centered about the location where the system estimates that the object or actor (e.g. person) is mostly likely to be located Multiple Trees and solution paths: Even with such error handling methods, the system still is likely to have various conflicts and report objects or actors with uncertain locations or paths. As a result, occasionally the system will report that that the path of a particular object or actor through time and space may have multiple possible solutions. To cope with this, in some embodiments, the system software may be configured to create and maintain "multiple solution paths or trees". The system can maintain these multiple paths or trees as long as the various uncertainties and multiple path scenarios exceed a certain threshold. However when further data shows that the probability of alternate paths is now becoming too low, and only one path is likely, then the software can also automatically prune these unlikely paths. That is, certain trees or paths are chosen as the right path and other trees or paths are then automatically deleted or discarded. This approach is used in many of the algorithms disclosed herein.

STEP 6: in step 6, the system builds and maintains a large data model with real-time object and actor information. The goal of this step of the process is to build and maintain a computer database that has a complete picture of all objects and actors (e.g. people, and vehicles) in a region, as well as maintain continuous, real-time information on the location, speed, direction of the various objects and actors. Often this large data model can be updated at a rate of once every 100 seconds (e.g. 0.01 Hz) to 100 times a second (e.g. 100 Hz), although this may of course be altered as needs and system capacity vary.

The large data model and structure will generally carry information of all actors (e.g. people, vehicles etc.), actor ID codes, and locations, as well as information on all objects (e.g. products) with their locations, any associations with actors, and object identification code. The large data model can also carry other information related to objects and actors as needed.

This data model and associated information is generally stored in a computer memory structure or database, and in some embodiments may be also transmitted to other sites for storage or analysis using standard methods (e.g. Internet, local area networks, wide area networks, serial communications methods and the like). This large data model and structure can then be analyzed further as discussed below.

Step 7 can be considered in turn to be divided into two parts, step 7A and step 7B. In step 7A, once the system has acquired the underlying data as outlined in previous steps 1-6, the system can then use this data to learn about the areas that it is observing, and analyze various things including how actors (e.g. people) behave, what objects (e.g. products) are used together, object flow (e.g. product flow) and analysis. The system can also be used to identify the location of any object of interest at any given time. When used in a product sales context, the system can track which objects (here products) are taken by which actor (here a customer) and subsequently taken to product checkout. The system can also be used to track locations of objects in a warehouse, and other applications as previously described.

In Step 7B, the system can also be used to alert users when there are various events or abnormal activities. Here for example, the system can be configured to automatically send out alerts in various situations such as wrong actors (wrong people) in the wrong locations, wrong objects in the wrong locations, abnormal or wrong time based events (e.g. objects are in motion after normal working hours), wrong combinations of actors (people) and objects (products)—i.e. an actor identified as an underage child carrying an object (such as a tagged case of an alcoholic drink or tagged carton of cigarettes), and so on. The system can be programmed to sound alerts, send out SMS messages, emails, and the like whenever such abnormal events are detected.

In Step 8, the system can also be used for various other functions, such as automatically handling queries and answers to operational and business questions, outputting reports, and the like. The system will generally output its answers in the form of reports on the various objects (e.g. products) and actors (e.g. various people and vehicles involved). These reports can be in the form of various automatically generated management reports, summary web reports and web dashboards, charts, and the like.

The system can also allow its database to be searched, either in real-time or retrospectively, and can be configured to answer queries such as locations of objects (e.g. products) and actors (e.g. people) at various times, what actors are associated with which objects (e.g. which people are getting which products), location of objects (e.g. products) with a specific identification code, which objects may be in the wrong location, and the like. The system can also be used for various financial applications, such as billing (e.g. point-of-sale billing when customers purchase particular products), determining if a particular individual paid for any products that may have been accidentally been left behind, and the like. The system can also be used to monitor inventory "shrinkage" and loss prevention due to theft and other causes.

The system, solution, and the Algorithms and strategies are general and can be used with multiple and many types of sensors. The samples given are only examples and can be used with many different sensors like Video sensors, GPS sensors, WiFi transceiver sensors, RFID tag readers, and the like.

Summarizing further, the system can obtain and correlate information pertaining to the location and velocity of various objects and actors based on forming various observations and tentative hypothesis. For example, the system may observe that various objects have a similar location and velocity as a particular actor, and may thus assign some probability that the objects are associated with that actor. Here the location of the actor or object can be determined with higher precision by aggregating data from multiple sensors, often located near the actor or object of interest. Various methods to be discussed (e.g. filters, averaging, weighting, majority voting, single closest sensors) may be used to combine such multiple sensor data.

The system may also operate on the general assumption that objects do not move without an actor. That is, any object that is moving or that gives evidence of being moved in the past can be assumed to have done so under the influence of an actor that carried the object, and this rule in turn can be used to estimate the probability that various suspect actors may have carried or be carrying the object. To do this, the system will keep track of the location and velocity of the various objects and actors to the best of its ability, and then make various predictions and projections based upon this location and velocity data.

The system can also use similar methods to keep track of the direction and movement of clusters or groups of objects, as well as to estimate the probability that a particular observed cluster of objects is forming a cluster that is persisting over time to an extent greater than chance.

The system can also be configured to attempt to automatically self-correct or adjust itself whenever it detects problems or inconsistencies in object or actor location or velocity data. When such automatic self-correction or adjustment fails, the system can also automatically report that the status of a particular object or actor is unknown or unresolved, at least until more data is obtained.

Tree analysis: As previously discussed, in some embodiments, the system may also attempt to estimate the "true" location of an object or actor by combining data from various sensors over various time periods, and computing various alternate potential paths that an object or actor could have taken. Each different potential path can be considered to be a different branch of set of nodes on various possible solution trees. Such alternative paths can be assigned different probability ratings. The probability of any particular path can be estimated based on factors such as sensor location, estimated errors in sensor measurements (e.g. RFID tag reader data may vary in the signal strength of different RFID tags that it reads), and other cumulative confidence and probability data. As more data accumulates, some paths or decision trees can be given higher probability, while others can be deweighted.

Mathematical Modeling Methods 1:

In this section, a first set of algorithms useful for various types of "fusing" or aggregating data from multiple sensors, correlating the data, and then analyzing according to various algorithms, is discussed. Although this discussion does not reference any specific sensor type, it should be assumed that generally the previously discussed sensor types may be used. However these algorithms also describe a more general framework for combining or fusing data from multiple sensors, and thus other sensor types may be used for these purposes as well.

The notation used is as follows. The variable of interest will be denoted by $\theta$. Here for example, $\theta$ could be a 2D variable representing the (x,y) location of the target object to be tracked, and the value of this variable is not directly known and instead has to be estimated from observations. The observations made with the sensors will be denoted by z. With N sensors, there will be N observations $z_1$, $z_2$, ..., $z_N$, each representing a measurement for the actual variable $\theta$. Given the observations $z_1$, $z_2$, ..., $z_N$, it is desired to optimally estimate the true value of the quantity of interest $\theta$.

Kalman Filtering for a Single Sensor:

Most sensors have at least some random noise associated with them. For example, some RFID tag readers can have a random location error of as much as 15 ft. in data measurements. Thus using raw sensor measurement data directly to form the track for an object is sometimes not advisable. Instead various filtering methods, such as Kalman filters, may be used.

The Kalman filter is a linear estimator which estimates the state of a system (quantity of interest $\theta$) in a recursive fashion by employing statistical models for how $\theta$ evolves over time and how the measurements or observations z relate to the state. Below we briefly describe the basic principles of the Kalman filtering.

The state of how a system evolves over time can generally be assumed to be governed by the following linear stochastic difference equation:

$$\theta[k]=A\theta[k-1]+Bu[k-1]+w[k-1] \qquad \text{(equation aa)}$$

while the observations are made according to:

$$z[k]=H\theta[k]+v[k] \qquad \text{(equation ab)}$$

here w and v denote the process and measurement noise respectively and are assumed to be independent Gaussian process.

The Kalman filter works by iteratively using a set of "predict" and "correct" equations. In the predict stage, the state and the error covariance matrix are updated to get the a-priori estimates. In the correct stage, the a-priori state estimate is corrected by adding a weighted innovation term using the measurement obtained. The error covariance matrix is also updated in this stage.

Kalman Filtering for Multiple Sensors:

The single sensor Kalman filtering technique described above can be extended to incorporate multiple sensors as well. The model for the state of the system remains the same as above because all sensors are observing the same quantity of interest. The observation model on the other hand now becomes—

$$z_n[k]=H_n\theta[k]+v_n[k] \qquad \text{(equation ac)}$$

for n=1, 2, ..., N

This observation model can be combined into a composite model by defining an observation model such as:

$$z[k]=[z_1^T[k],z_2^T[k],\ldots,z_N^T[k]]^T \qquad \text{(Equation a)}$$

and $$H[k]=[H_1^T[k],H_2^T[k],\ldots,H_N^T[k]]^T \qquad \text{(Equation b)}$$

and $$v[k]=[v_1^T[k],v_2^T[k],\ldots,v_N^T[k]]^T \qquad \text{(Equation c)}$$

Now with this composite model, the system can rewrite the observation model as $$z[k]=H\theta[k]+v[k] \qquad \text{(Equation d)}$$

which is same as the one used in the single sensor model. Now the system can use the Kalman filtering technique for the multi-sensor case just like it was used is the single sensor case.

Probabilistic data fusion for multiple sensors:

Any sensory data almost always has some uncertainty associated with it. Hence the use of a probabilistic framework for data fusion is justified. The system generally assumes that a sensor model for each sensor is known or can be computed, specifically it means P(z|θ), the conditional probability distribution function is available. For example P(z|θ) could be a Gaussian random variable with mean θ and a constant or variable standard deviation σ. Now given a prior probability density P(θ), the posterior distribution function P(θ|z) can be computed using the Bayes theorem as follows—

$$P(\theta \mid z) = \frac{P(z \mid \theta) P(\theta)}{P(z)} \quad \text{(Equation f)}$$

P(γ|z) can be interpreted as follows—given an observation z, it associates with each possible θ a probability value. In other words, it is the likelihood function for θ given the observation z.

Bayes theorem can be applied to fuse the observation data $z_1, z_2, \ldots, z_N$ from multiple sensors. The system can write $$P(\theta \mid z_1, z_2, \ldots, z_N) = \frac{P(z_1, z_2, \ldots, z_N \mid \theta) P(\theta)}{P(z_1, z_2, \ldots, z_N)} \quad \text{(Equation g)}$$

So it is required to compute the joint distribution P($z_1, z_2, \ldots, z_N$|θ). While it is quite a daunting task to specify this full joint distribution, in most cases the system can make the simplifying assumption of conditional independence, i.e.

$$P(z_1, z_2, \ldots, z_N \mid \theta) = P(z_1 \mid \theta) \cdot P(z_2 \mid \theta) \ldots \cdot P(z_N \mid \theta) \quad \text{(Equation h)}$$

and hence the system can write $$P(\theta \mid z_1, z_2, \ldots, z_N) = \quad \text{(Equation i)}$$
$$\frac{P(z_1 \mid \theta) \cdot P(z_2 \mid \theta) P(\theta) \ldots \cdot P(z_N \mid \theta) P(\theta)}{P(z_1, z_2, \ldots, z_N)}$$

It should be noted that the above method can be implemented in an iterative fashion where the posterior from the previous time step, updated to incorporate dynamics of the object, becomes the priori for the next time step.

Fusing data from multiple sensors together for tracking purposes:

In the above the system have described methods to combine measurements or observations obtained from different sensors, and the estimator then fuses these data to compute a combined estimate of the state of the system. Instead of fusing the observations, a different approach could be to fuse the track information from each sensor. In other words, each sensor site estimates the state of the system locally and independently thus forming a local track of the state, and a central fusion system then combines these tracks to obtain a fused estimate of the global track.

A simple track combination approach would be to compute the average of the tracks weighted by their variance, as shown below—

$$\theta_A[k] = Q[k] \sum_{i=1}^{N} Q_i^{-1}[k] \theta_i[k] \quad \text{(Equation j)}$$

where $\theta_A$ is the fused track estimate, $\theta_i$ is the track from the $i^{th}$ sensor, $Q_i$ is the process covariance matrix for the $i^{th}$ sensor and Q is given by $$Q = \left[ \sum_{i=1}^{N} Q_i^{-1} \right]^{-1} \quad \text{(Equation k)}$$

One problem with the above approach is that it ignores the correlation between the tracks. If the cross-correlation Q, between 2 tracks is known or can be computed, then the system can use that to compute the fused track estimate as follows—

$$\theta_A = \theta_i + \chi(\theta_j - \theta_i) \quad \text{(Equation l)}$$

where $$\chi = (Q_i - Q_{ij})(Q_i + Q_j - Q_{ij} - Q_{ij}^T)^{-1} \quad \text{(Equation m)}$$

Data Association and Track Assignment

Object-Centric Analysis:

Here the system discuss the problem of associating an item (object) with the actor (person, subject) who has its possession, such as is typical in a retail store where shoppers (or employees) keep products in a cart while moving about in the store. Typically in our case, the measurement data for the object to be associated is typically the RFID data or WiFi data, and the measurement data for the actor to whom it has to is the video data. Assuming a common state for the system (since the actor and object are co-located and moving synchronously), the system can compute:

$$z_o[k] = f(x[k], v[k]) \quad \text{(Equation o)}$$

and $$z_s[k] = g(x[k], w[k]) \quad \text{(Equation p)}$$

where $z_o[k]$ is the object measurement at time k, $z_s[k]$ is the actor measurement at time k, f and g are possibly some non-linear functions, v[k] and w[k] are random noise and x[k] is the true state of the system.

Now the data association problem consists of associating for each time k, the object measurement $z_o^{(i)}$ to one or more actor measurements $z_s^{(j)}$ where the superscripts i and j refer to the indices of objects and actors in the environment. This is illustrated pictorially in FIG. 4.

Figure 4:
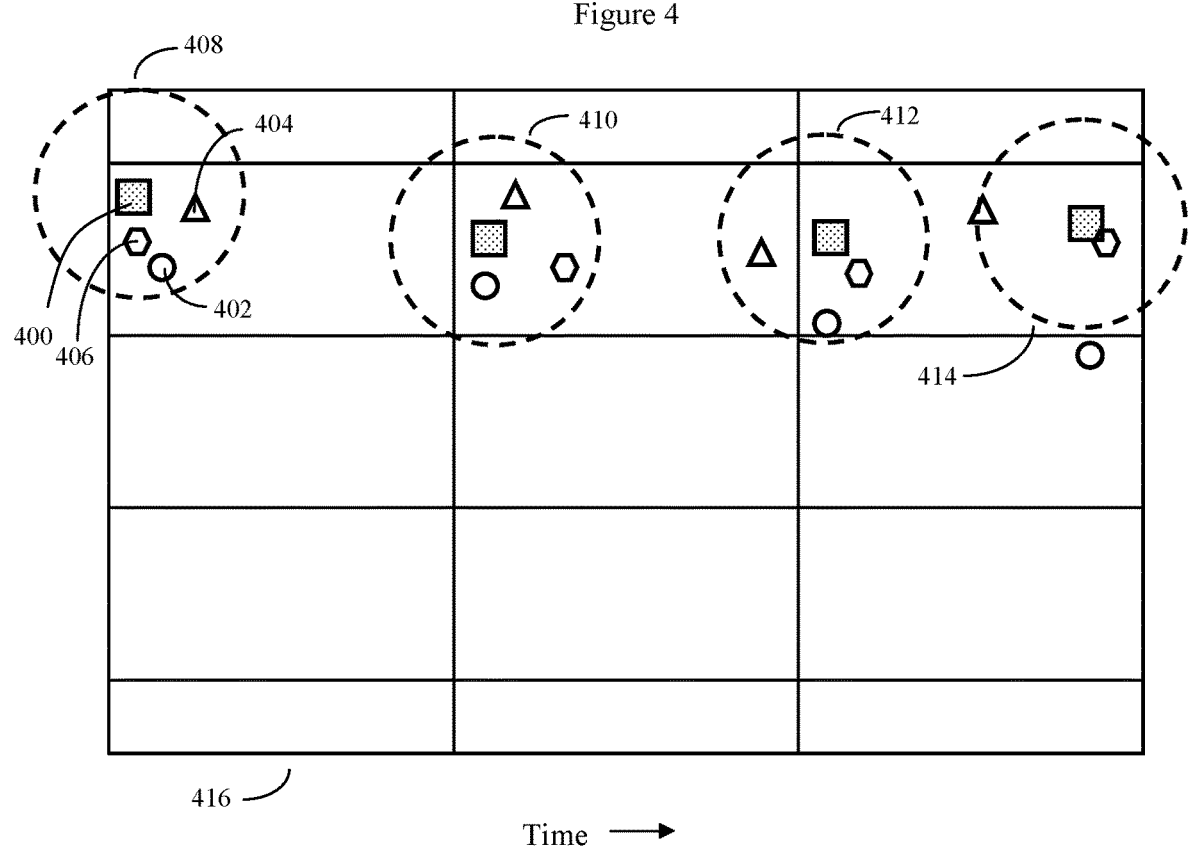
FIG. 4 shows the system operating in object centric analysis mode where it is trying to determine which of several actors are moving a particular object.

In FIG. 4, the rectangle (400) represents the object (item). The small hollow circle (402), triangle (404), and hexagon (406) shapes represent 3 actors (e.g. persons) in the vicinity of the object (400). The big, dashed-line circle (408), (410), (412), (414) represents the valid proximity region from a sensor error standpoint. This can be, for example, the approximate range and location uncertainty of the various RFID tag reading sensors (114) shown in FIG. 1.

Here the object (400) is moving, being carried by an unknown actor (either actor 402, 404, or 406 but the system can't yet tell which actor is responsible), and the approximate location of the object and actors are shown at 4 different time points (408), (410), (412), and (414). The grid (416) represents an x-y location map of the environment—for example the floor plan from FIG. 1 as seen from above.

In FIG. 4 consider an example scenario where there is 1 object and three candidate actors (persons, subjects) with which the object could be associated, as the system receives the measurements at 4 time points. The true actor (person, subject) associated with the object (400) is the one represented by the hexagon (406).

If the association rule is based on proximity for example, then the system would associate all three actors (persons, subjects) (402), (404), and (406) with the object (400) at time points 1 (408), 2 (410) and 3 (414); and the actors (406) and (404) with the object (400) at time point 4 (414). However what is desired is an assignment method that should be able to resolve the ambiguity over this period of time by realizing that it is only actor (406) that has a track is always consistent with that of the object.

Our algorithm is hence composes to two steps. The first step is the data association step which could be represented in general by the following rule:

$$R_{assoc}:(z_o,\{z_s^1,z_s^2,\ldots,z_s^N\}) \rightarrow \{I\} \quad \text{(Equation q)}$$

At each time point, $R_{assoc}$ finds the list of indices of the actors to whom the object could be associated with. A simple example of this rule could be one based on (immediate or historic) distance proximity. Another rule could be the one that does a soft assignment to each of the actors, such as a probability value instead of a hard 0 or 1 assignment.

The second step of our algorithm is the data assignment step wherein given the association record of an object over a period of time, the system computes the best (or the top most probable) track assignments for the object. In other words, the system computes one or more high probability tracks that can be attributed to the object. The assignment could be computed in a variety of ways. For example one possible rule could be based on selecting the associations at each time step such that it maximizes the sum of probability values. Another rule could be one that associates a penalty cost parameter with every new association from one time step to another, i.e. a track that maintains the assignment of object to the same actor has a lesser penalty cost parameter than a track that assigns the object to different objects at different time points. This rule could be inspired based on the fact that it is highly probable that an object will be in possession of the same person as it moves inside the store over a period of time.

Figure 5:
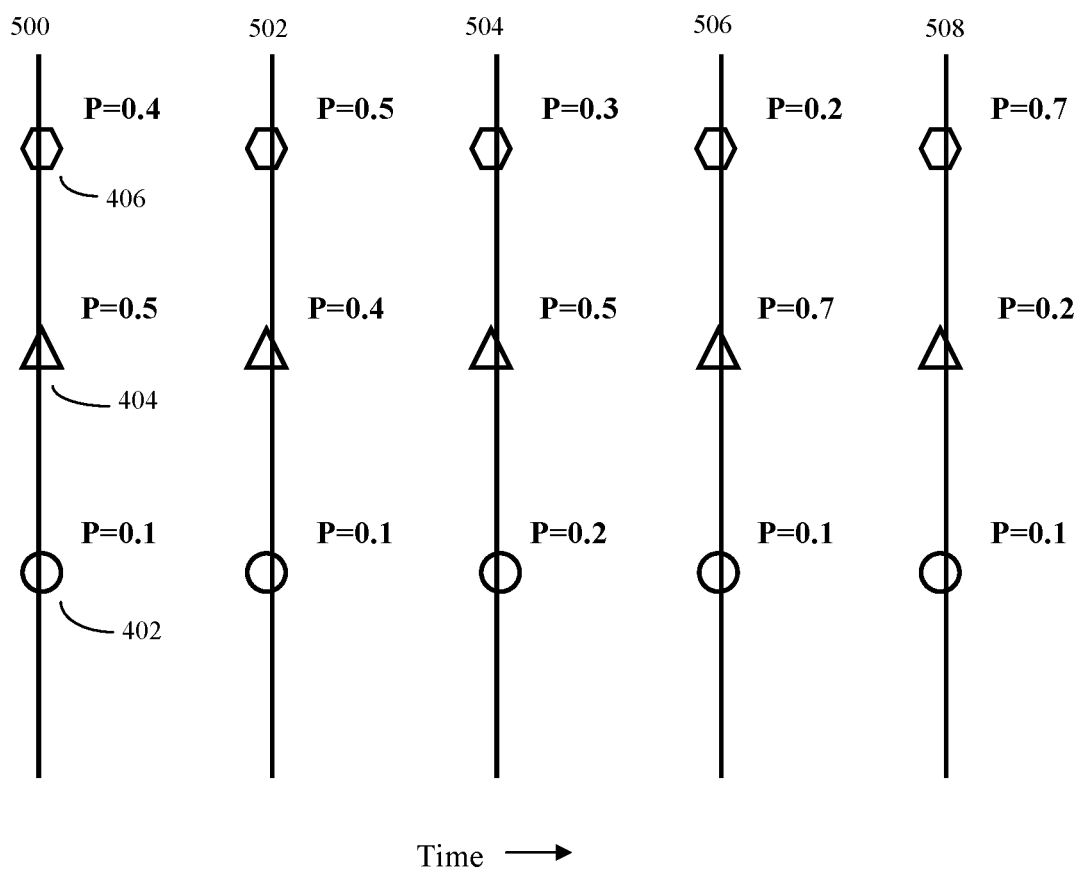
FIG. 5 shows how the system can use sensor data and attempt to determine the relative probability that an object of interest is associated with various actors at different time points.

FIG. 5 shows an example of data association for an object over a time period, here over five different time points (500), (502), (504), (506), and (508). Note that in this case the algorithm uses a soft assignment, meaning every actor (person, subject) in the environment gets an association probability value between 0 and 1.

Figure 6:
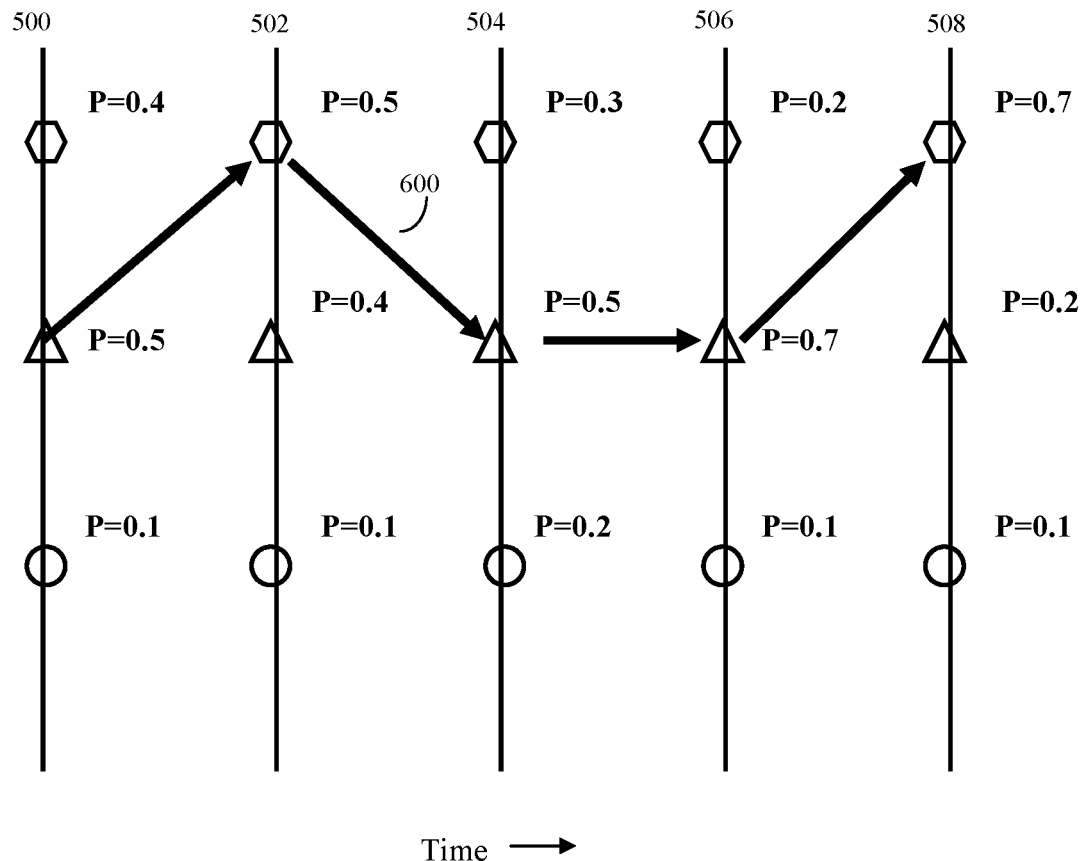
FIG. 6 shows how if the system merely attempts to associate the object of interest at any given time point with the most probable actor at a given time point, a path for the object may be constructed, but here this path may be unrealistic because the path shows the object being passed between different actors (e.g. people, customers), which is not usually the case.

The system can also start to form various hypotheses about what objects are associated with what actors, and how the position of the various objects and actors may associate over time. This is shown in FIG. 6. FIG. 6 shows a possible track assignment for the object (400) based on computing a highest probability path (600). Note that this particular path (600) does not attribute any penalty cost parameter associated with "jumping" from one actor (e.g. person, subject) to another from one time point to the next. This is clearly a bit unrealistic in many situations, because for example, shoppers (actors) do not normally exchange items (objects) while shopping (although it does occasionally happen).

FIG. 6 thus shows an example of data assignment wherein the assignment rule is based on computing the highest probability path for the object, without including any penalty cost parameter(s) for assigning different actors at different time points.

Figure 7:
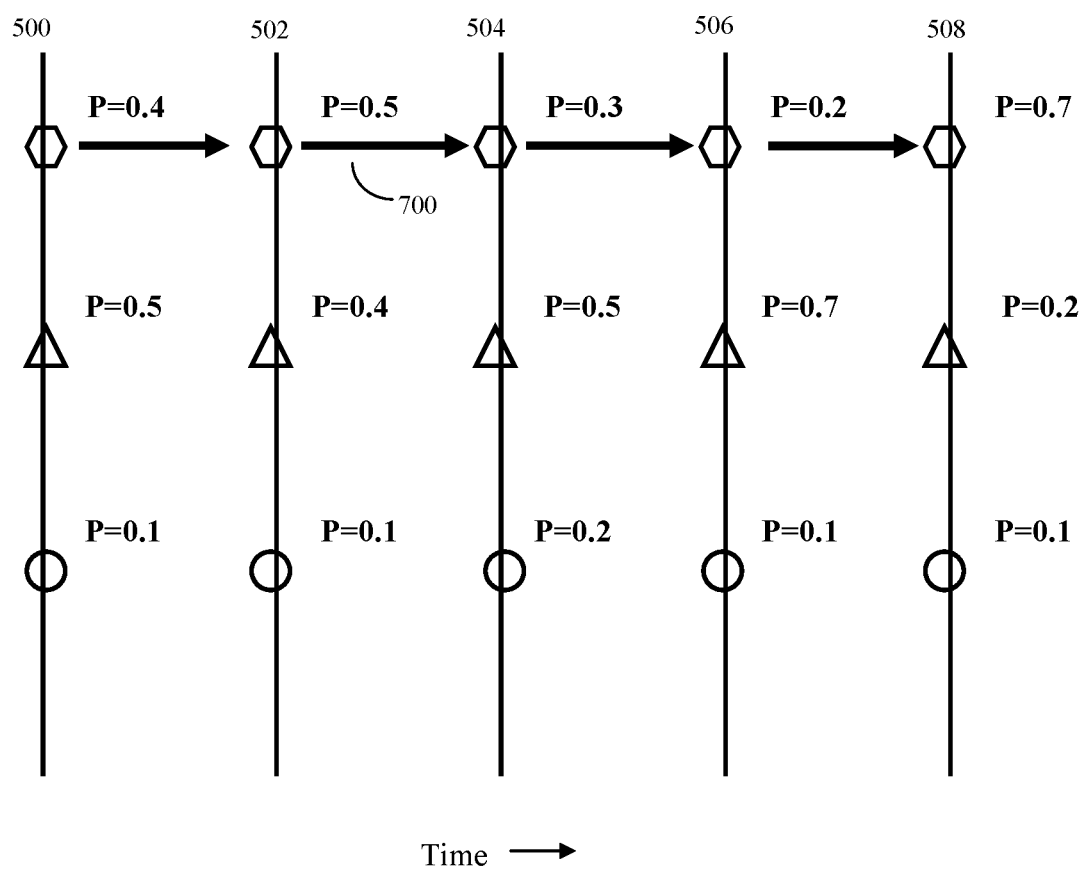
FIG. 7 shows how if the system uses additional rules or constraints, such as the rule or constraint that an object is not usually passed between actors (here this can be done by assigning a penalty cost parameter when the object "jumps" between actors), a more realistic path, where the object of interest was consistently carried by the same actor, can be determined.

By contrast, FIG. 7 shows a possible track assignment (700) for the object (400) based on computing the highest probability path as well as associating a penalty cost parameter for "jumping" from one actor (person, subject) to another from one time point to the next FIG. 7 thus shows an example of data assignment wherein the assignment rule does incorporate a penalty cost parameter for assigning an object to different actors (persons, subjects) at different time points, thus favoring paths which maintain consistent assignment of objects to actors. As previously discussed, the system can intelligently vary this penalty cost parameter depending upon information from other sensors.

Thus in some embodiments, the system can use one or more processors to compute both the actor path data and the object location over time and to determine if the location of a given object and the path of a given actor correlate over time. This will let the system determine at least one tentative association probability between a given object and a given actor by following various steps such as:

1: using the system processors (and associated software) to minimize noise induced errors by combining and filtering data from at least some second sensors in said set of second sensors (in the case of FIG. 1, this would be by combining and filtering data from at least some of the RFID tag reading sensors 114).

2: using the system processors to determine if the location of a given object and the path of a given actor correlate over time by computing the likely proximity between the given object and the path of the given actor over a plurality of time points.

3: using the system processors to compute a likely track of the given object over this plurality of time points, and compute if this likely track of the given object over time correlates with the path of the given actor over this plurality of time points.

Actor-Centric Analysis:

In the above discussion we discussed the problem of associating an object (item) with actors (such as people) and then later on computing the track assignment for the object over a period of time. Here we do the reverse analysis, i.e. associate an actor (e.g. a person) to all the objects he/she may be carrying over a period of time. We call this analysis actor-centric. A key difference in actor-centric analysis is that the number of objects associated with the actor may keep changing with time (typically increasing) as the actor moves around (e.g. our shoppers in FIG. 1 may continue to add objects to their shopping cart as they shop). In this case also, the data association rule at every time point could be generalized in a similar way as before:

$$R_{assoc}:(z_s,\{z_o^1,z_o^2,\ldots,z_o^M\}) \rightarrow \{I\} \quad \text{(Equation r)}$$

That is, at each time point, given the actor measurement and nearby objects measurements, $R_{assoc}$ finds the list of indices of the objects with whom the object could be associated with. A simple example of such a rule could be one based on proximity. Further with each object we could also associate an instantaneous confidence measure of that object being associated with the actor.

FIGS. 8A-8D show an example of 2 actors (800, 802) carrying 2 objects each, at 4 different time points, time (k=1, 2, 3, and 4). This is similar to FIG. 1, which shows the case where the actors are shoppers pushing shopping carts filled with various objects (e.g. items for sale) in a store. As the two actors (two shoppers) get close to each other, for example, the RFID tag readers (114) will have difficulty distinguishing if the RFID tagged objects are in one shopping cart or the other shopping card, but as the shoppers move apart again, it becomes easier for the various RFID tag readers (114) to spatially separate the various objects and again distinguish between the two actors.

Figure 8A:
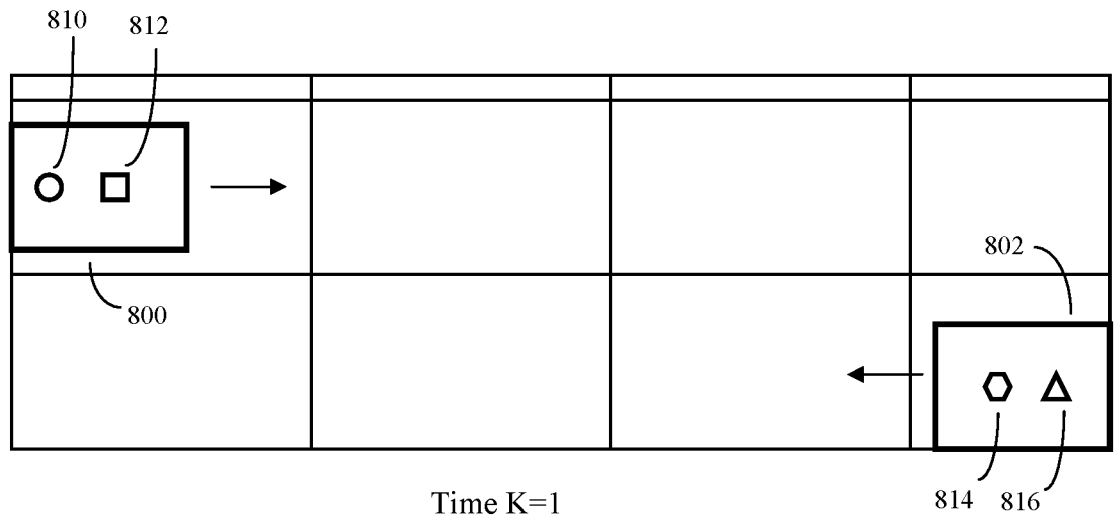
FIG. 8A shows the system operating in actor centric analysis mode. Here, similar to the retail store example shown in FIG. 1, two actors (shoppers) are each carrying different objects at a first time point, where the assignment of objects to each actor is not ambiguous because the RFID tagged objects carried by actor (800) are sufficiently distant from the RFID tagged objects carried by actor (802) that RFID tag reader sensors can clearly distinguish that objects (810) and (812) are spatially distant from objects (814) and (816).

FIG. 8A shows two actors (top and bottom rectangles) carrying two objects each at time k=1. Here actor (800) is carrying objects (810) and (812), while actor (802) is carrying objects (814) and (816). It may be helpful to assume that the objects are tagged with RFID tags, and that the position of the objects can be approximately tracked (with a fair amount of position uncertainty) by various RFID tag readers (114). For FIGS. 8A-8D, assume that the two actors are passing each other in the aisles of the store (100) while they shop.

Figure 8B:
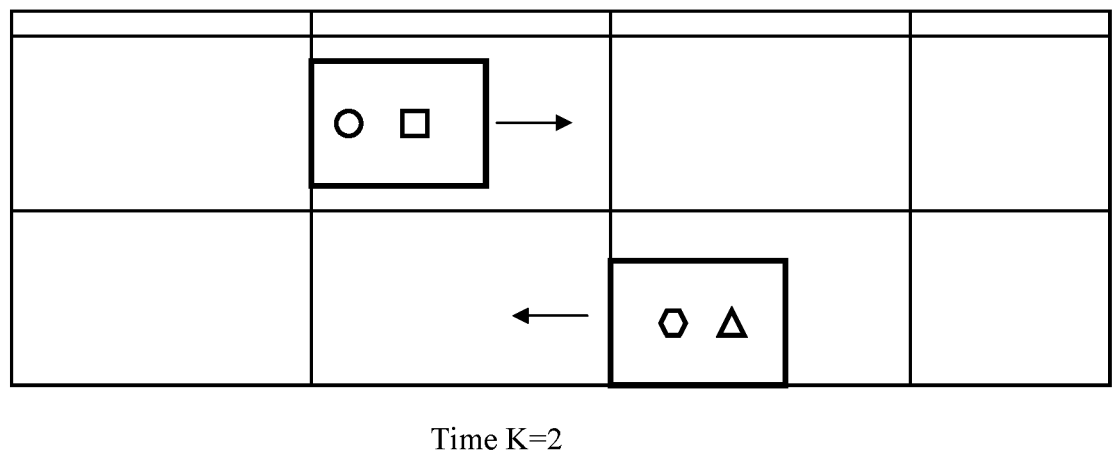
FIG. 8B shows the two actors (shoppers) are each carrying different objects at a second time point. Here the assignment of objects to each actor is more ambiguous because the objects are now so close together that RFID tag sensors, although detecting the RFID tagged objects, may not be able to separate location of the various objects in space.

FIG. 8B shows the two actors (top and bottom rectangles) carrying two objects each at time k=2.

Figure 8C:
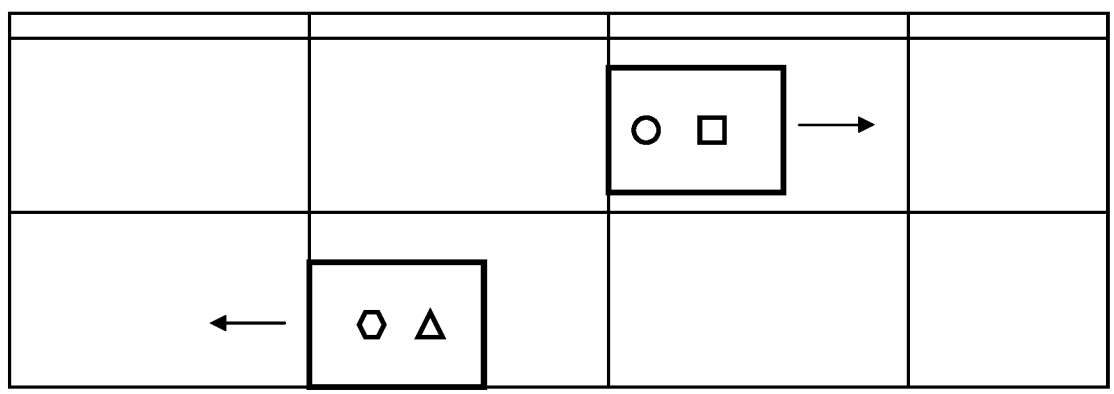
FIG. 8C shows the two actors (shoppers) are each carrying different objects at a third time point. Here the assignment of objects to each actor is again ambiguous for the same reasons.

FIG. 8C shows the two actors (top and bottom rectangles) carrying two objects each at time k=3.

Figure 8D:
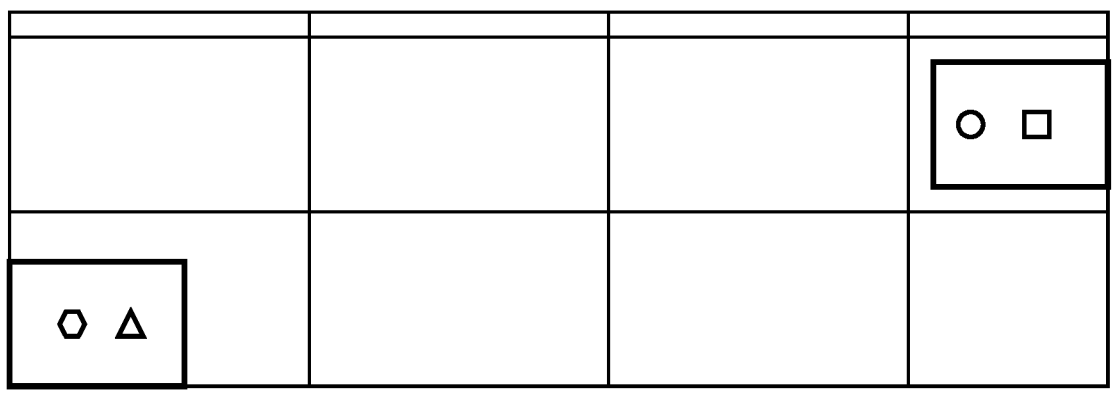
FIG. 8D shows the two actors (shoppers) are each carrying different objects at a fourth time point. Here the assignment of objects to each actor is once again not ambiguous.

FIG. 8D shows the two actors (top and bottom rectangles) carrying two objects each at time k=4.

This list of associated indices and confidence measures could then be maintained for every time point for the various actors. For example, for the case shown in FIGS. 8A-8D above, the association map between the various objects (810), (812), (814), (816) and the top actor (800) can be as shown in FIG. 9.

Figure 9:
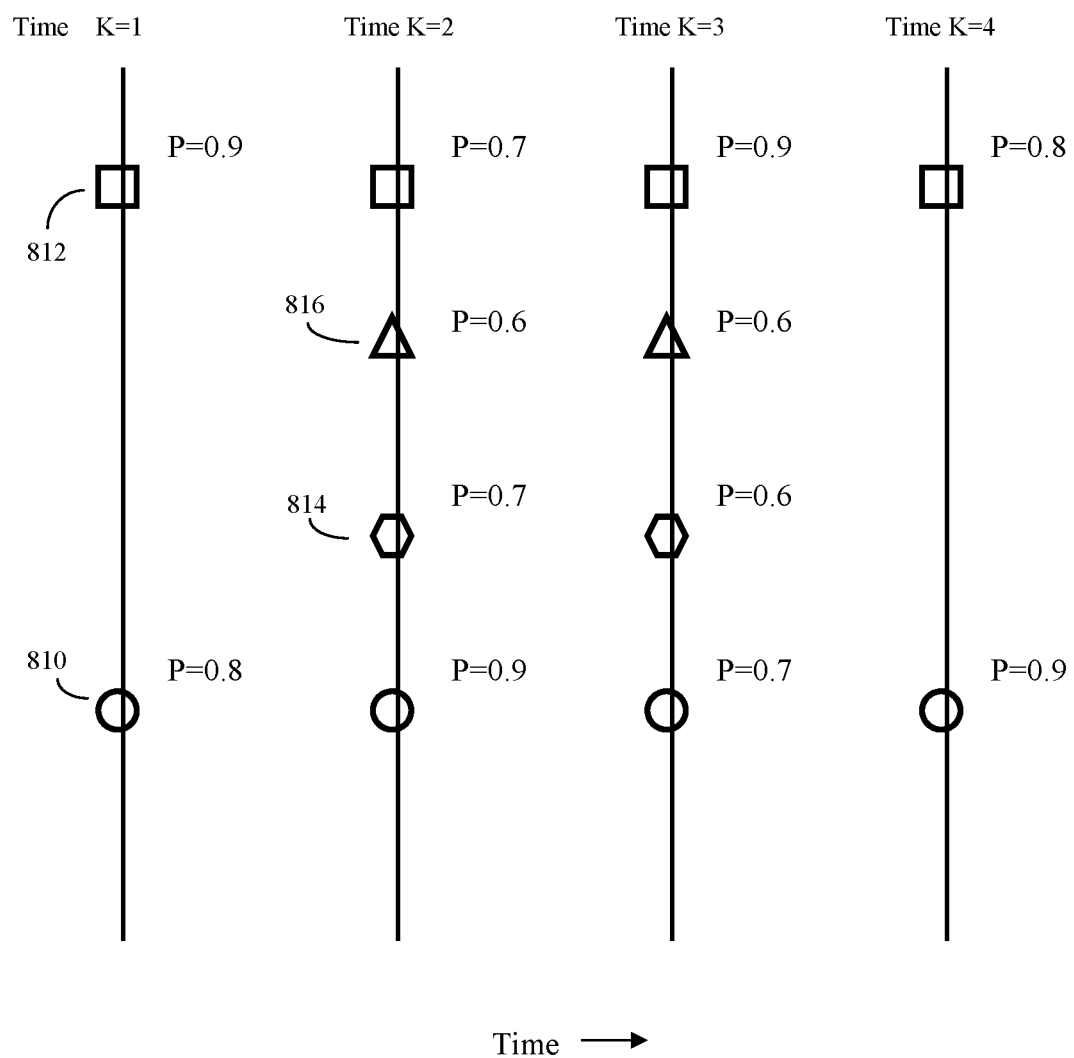
FIG. 9 shows the probability of association between the various objects in FIG. 8 and the top actor (800) in FIG. 8 over various time intervals. Note that that at different times, different objects may be associated with this actor, and that some of these object—actor associations may be ambiguous (here because the RFID tag reader sensors can't tell that the objects are grouped in different spatial locations).

FIG. 9: Association map for the top actor (800) shown for 4 time points K=1, K=2, K=3 and K=4. Note that in reality the true association only includes the objects (810) and (812). The other objects (814) and (816) are actually carried by the bottom actor (802), but objects (814) and (816) are in close proximity to the top actor (802) at time points K=2 and K=3. Close enough that, for example, that the RFID tag readers (114) might be confused.

For the assignment rule, we can consider a window of time up to the current time, and establish which objects should be assigned to which actor. For example from the figure we can see that although objects (814) and (816) appear at time points K=2 and K=3 in the association map for the top actor (800), if we consider the time window from K=1 to K=4, we (e.g. the systems processor and software) can filter objects (814) and (816) out as false objects in actor (800)'s association map.

In general, the assignment rule can be a function of the distance that the object has traveled with the actor, the time the object has been with the actor, the association probability or confidence for the object, and the track correlation between the object and the actor.

Conflict Resolution:

The actor-centric assignment analysis described above does not guarantee that it will produce unique assignments of an object to an actor (e.g. person). In other words, it is possible that the same object may be assigned to two (or more) different actors at the same time (possibly when the actors are moving in the vicinity of each other). However such a conflict is easy to resolve. Here, for example, the system can simply postpone the assignment decision until a later time when there is no conflict in the object's assignment. For example in the case considered above, if we run the assignment analysis at time K=3, then the objects (814) and (816) may be assigned to both actors (800) and (802). This will result in a conflict for objects (814) and (816). Hence we (e.g. the system software) can postpone their assignments (not make a decision at time K=3). By the time we reach time K=4, objects (814) and (816) will be uniquely assigned to the bottom actor (802) only, and the system can now make an accurate assignment decision.

Thus in this case, the invention can be used to determine which various different objects are likely to be associated with a given actor. This can be done for determining, for a given actor, at least one conflict resolution time when a sum of the association probabilities between the given objects and said given actor is at a local maximum value. In FIG. 9, for example, this would be either time K=1 or time K=4. The system can then report for this given actor (here actor 800), at least the various different objects (here objects 810 and 812) associated with actor (800) at these one or more conflict resolution times.

Large-Scale Data Analysis:

In a preferred embodiment, the software architecture for the data analysis tasks described above will be designed to be highly scalable and hence be able to handle massive amounts of data, both for objects and actors. The invention's software architecture processes the data in both object-centric and actor-centric fashion. The object-centric analysis for active objects (meaning those which are moving) can be distributed across the computational nodes available. Any new object which becomes active and hence which has to be analyzed, can be assigned to the next available computational node. Similarly the actor-centric analysis can also be distributed across the computational node available and any new person to be analyzed can be assigned to the next available computational node.

Figure 10:
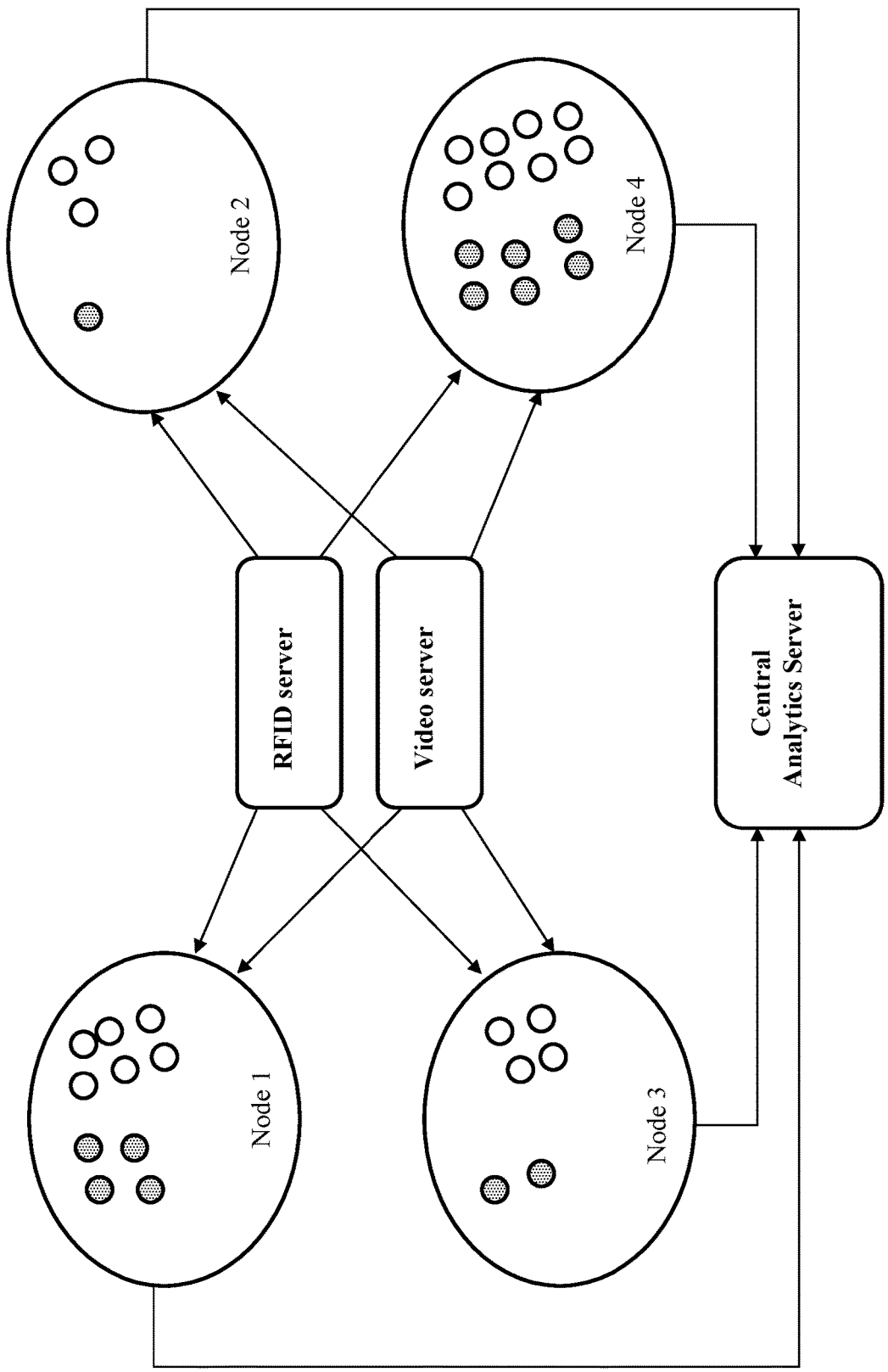
FIG. 10 shows how the system may operate on a scalable architecture type computer system comprised of various networked processor nodes that divide up computing loads for higher processing speed and efficiency.

The diagram in FIG. 10 illustrates the scalable architecture conceptually. It shows four computational nodes in the system each of which have access to the RFID and Video servers. It can be seen that Node 4 is the busiest as shown while Node 2 has the least amount of load. Hence any new objects or actors (persons) to be analyzed will be designated to Node 2. The nodes analyze the actors (e.g. persons) or objects designated to them and communicate their results to a central analytics server which assimilates the results from all nodes. The maximum load that a node can handle can be pre-computed and hence given the scale of the problem, the adequate number of computational node requirements can be determined. If the problem scales up beyond the expected load, it can be handled by merely adding more computational nodes to the system, without the need of any software or algorithmic re-design.

FIG. 10 thus shows the computational load distribution across 4 computational nodes which have access to the RFID and Video servers. The solid circles in a node represent the actor-centric analysis while the hollow circles represent object-centric analysis. The nodes analyze the actors (persons) or objects (items) designated to them and communicate their results to a central analytics server which assimilates the results from all nodes.

Mathematical Modeling Methods 2:

In this section, a second set of algorithms useful for various types of "fusing" or aggregating data from multiple sensors, correlating the data, and then analyzing according to various algorithms. This section is particularly useful for integrating data from video sensors and RFID tag sensors, but also can be used for other sensor types as well. As before, the system is designed to be able to cope with conflicting data by being able to create various alternative hypothesis paths or trees, and may determine when validation or confirmation needs more data to be obtained at a later time.

Generally, in this part of the discussion, assume that features identifying various actors and objects can be from sensors such as RFID tag readers and Video cameras. Assume also that the sensors generally have their respective fields of view are associated with the scene of interest, and that all sensors are calibrated. In some cases, the sensors may have intersecting fields of view.

For example, the video cameras may utilize computer image recognition algorithms to mask areas of the scene that are not of interest, detect edges, motion, and various features associated with actors or objects of interest. In some cases, GPS sensors and other types of sensors, such as WiFi detectors to detect WiFi identification codes from mobile devices carried by various actors may also be employed. More than one type of RFID scanner and tag may also be used.

Thus, for example, positions of the various objects or actors can be calculated using the real-world scene coordinates. Additionally, any RFID tags associated with object of interest can also be considered as being an additional feature of the object, and this RFID tag data also used to help resolve any conflicts. Thus for example if video-based image data and features extracted from video-based image data cannot resolve the exact location of an object or actor, additional data obtained from any RFID-based features can also be used by the system. The net result is that by merging data from multiple types of sensors, accuracy of the system is improved. Generally the more data that is combined using this approach, the better.

Thus in general, certain aspects of the system's multi-sensor data association methods can be described as follows. Generally we (e.g. the system) are given a sequence of observations, made at discrete time moments. Each observation is composed of a list of sensor-dependent objects with their respective positions. In at least some cases, the fields of view of at least some sensors may intersect. Additionally, there may be noise and uncertainty in the various observations.

Given these constraints, the goal is to associate or match the various observations in order to achieve a higher level understanding of what the various objects (and actors) are doing. This can be done by matching the data to various possible object trajectories or track. With each of these possible tracks, we associate a confidence probability value, which represents how well the data corresponds to the hypothetical tracks in our model of the objects.

Such a model may consist of various factors. In addition to the basic laws of physics, other information, such as insight into the behavior of actors (e.g. people) in various situations may also be included in the form of various actor behavior templates. Again, the overall criterion is to maximize the sum of object's trajectories and to thus compute a most likely object (or actor) trajectory.

Mathematically, this type of multi-sensor data association problem can be formulated as multi-index axial assignment problem. This type of problem rapidly becomes very complex as the number of actors and objects increases, however. Indeed prior art would consider this type of problem to be NP-hard (as early as a 3-index case) and thus very difficult to precisely solve. However according to the invention, in the following section we give formal description of the multi-index axial assignment problem and show how according to the invention, an extremely efficient heuristic method for solving such problems may be used.

Additionally, according to the invention, we further teach various methods of implementing these algorithms that increase the performance of the data to object matching process. This approach thus makes it possible to use multi-index axial assignment problem for various applications, such as for example integrating data from video cameras and RFID scanners for various retail tracking purposes.

Multi-Index Axial Assignment Problem:

Let N be the number of indexes, each of the index $i_l$ takes values from the set $\{1, \ldots, M_l\}$, $l \in \{1, \ldots, N\}$. Let $a_{i_l}^{(l)}, b_{i_l}^{(l)}$ be a given nonnegative integer parameters, $i_l \in \{1, \ldots, M_l\}$, $l \in \{1, \ldots, N\}$; c: $\{1, \ldots, M_1\} \times \ldots \times \{1, \ldots, M_N\} \rightarrow Z$ a given cost function, $i_l \in \{1, \ldots, M_l\}$, $l \in \{1, \ldots, N\}$. Consider multi-index variables $x_{i_1 \ldots i_N}$, where $$x_{i_1 \ldots i_N} = \begin{cases} 1, & \text{if } i_1 \text{ is assigned } i_2, \ldots, i_N \\ 0, & \text{otherwise} \end{cases},$$

$i_l \in \{1, \ldots, M_l\}$, $l \in \{1, \ldots, N\}$. Then we have the following problem formulation $$\sum_{i_1=1}^{M_1} \ldots \sum_{i_N=1}^{M_N} c_{i_1 \ldots i_N} x_{i_1 \ldots i_N} \rightarrow \min, \quad \text{(Equation 1)}$$

subject to $$a_{i_1}^{(1)} \leq \sum_{i_2=1}^{M_2} \ldots \sum_{i_N=1}^{M_N} x_{i_1 \ldots i_N} \leq b_{i_1}^{(1)}, i_1 \in \{1, \ldots, M_1\}, \quad \text{(Equation 2)}$$

$$a_{i_l}^{(l)} \leq \sum_{i_1=1}^{M_1} \ldots \sum_{i_{l-1}=1}^{M_{l-1}} \sum_{i_{l+1}=1}^{M_{l+1}} \ldots \sum_{i_N=1}^{M_N} x_{i_1 \ldots i_N} \leq b_{i_l}^{(l)}, \quad \text{(Equation 3)}$$

$i_l \in \{1, \ldots, M_l\}, l \in \{2, \ldots, N-1\}$, $$a_{i_N}^{(N)} \leq \sum_{i_1=1}^{M_1} \ldots \sum_{i_{N-1}=1}^{M_{N-1}} x_{i_1 \ldots i_N} \leq b_{i_N}^{(1)}, \quad \text{(Equation 4)}$$

$i_N \in \{1, \ldots, M_N\}$, $x_{i_1 \ldots i_N} \in \{0, 1\}, i_l \in \{1, \ldots, M_l\}, l \in \{1, \ldots, N\}$. (Equation 5)

According to prior art, the multi-index assignment problem (Equation1)-(Equation5) is known to be NP-hard if N>3. However in the following section we give an efficient heuristic for solving this problem.

Solution Algorithm:

The proposed heuristic algorithm is based on the polynomial solvability of a special decomposable sub-class. Here the cost function of the multi-index assignment problem has the following decomposable structure:

$$c_{i_1 \ldots i_n} = d_{i_1 i_2} + \ldots + d_{i_{n-1} i_n}, i_l \in \{1, \ldots, M_l\}, l \in \{1, \ldots, N\},$$

then the multi-index axial assignment problem can be reduced to a min-cost flow problem.

As an example of the reducibility scheme let's consider the following 3-index problem.

$$a_{j_3}^- \leq \sum_{j_1 \in J_1} \sum_{j_2 \in J_2} x_{j_1 j_2 j_3} \leq a_{j_3}^+, j_3 \in J_3,$$

$$b_{j_2}^- \leq \sum_{j_1 \in J_1} \sum_{j_2 \in J_2} x_{j_1 j_2 j_3} \leq b_{j_2}^+, j_2 \in J_2,$$

$$c_{j_1}^- \leq \sum_{j_2 \in J_2} \sum_{j_3 \in J_3} x_{j_1 j_2 j_3} \leq c_{j_1}^+, j_1 \in J_1,$$

$$d_{j_1 j_2}^- \leq \sum_{j_3 \in J_3} x_{j_1 j_2 j_3} \leq d_{j_1 j_2}^+, j_3 \in J_3,$$

$$x_{j_1 j_2 j_3} \geq 0, j_1 \in J_1, j_2 \in J_2, j_3 \in J_3,$$

-continued $$\sum_{j_1 \in J_1} \sum_{j_2 \in J_2} \sum_{j_3 \in J_3} (u_{j_2 j_3} + v_{j_2} + w_{j_3}) x_{j_1 j_2 j_3} \to \min.$$

Figure 11:
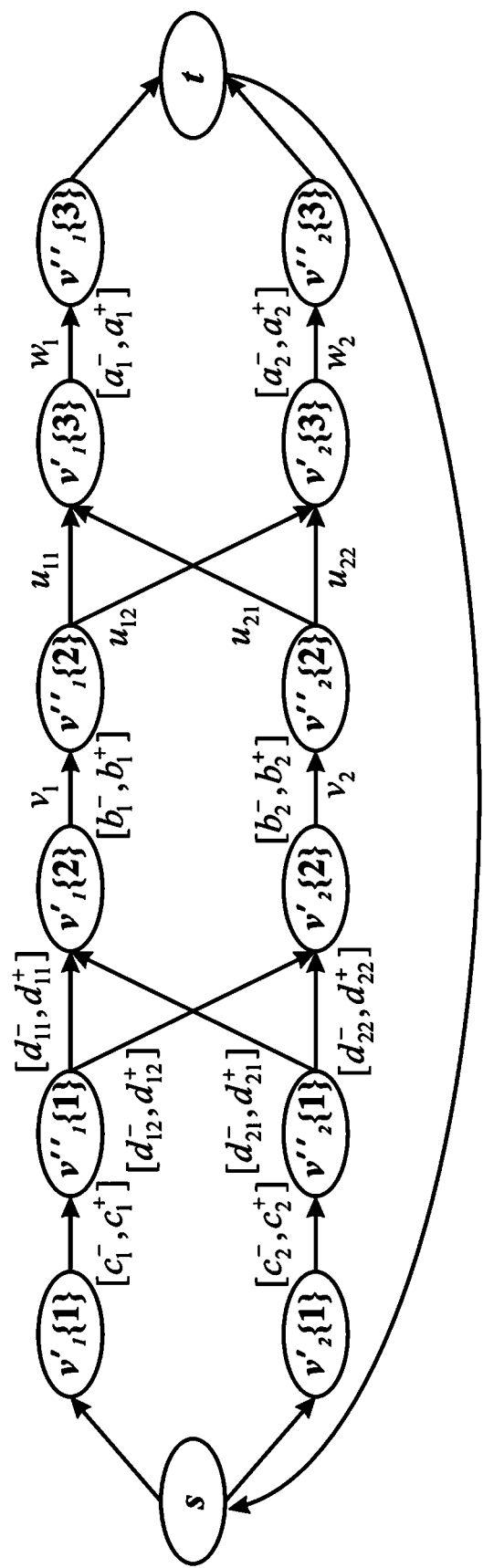
FIG. 11 shows a network diagram showing some of the invention's algorithms in more detail. Here

Let $|J_1|=|J_2|=|J_3|=2$, then the corresponding min-cost flow problem is described by the following network, shown in FIG. 11.

FIG. 11 shows a network diagram of how the NP-hard multi-index axial assignment problem can be reduced to a more manageable min-cost flow problem, which in turn can be solved using known network optimization algorithms.

In a general case, the multi-index axial assignment problem can be reduced to multi-index axial assignment problem with decomposable cost function. Here let $d_{i_1 i_2}, \ldots, d_{i_{N-1} i_N}$, $i_l \in \{1, \ldots, M_l\}$, $l \in \{1, \ldots, N\}$ be unknowns, then consider the following mathematical programming problem of multi-index cost matrix approximation $$\text{dist}(\{c_{i_1, \ldots, i_N}\}, \{e_{i_1, \ldots, i_N}\}) \to \min, \quad \text{(Equation 6)}$$

subject to $$e_{i_1 \ldots i_N} = d_{i_1 i_2} + \ldots + d_{i_{N-1} i_N}, \ i_l \in \{1, \ldots, M_l\}, \ l \in \{1, \ldots, N\}. \quad \text{(Equation 7)}$$

Here dist( ) is a multi-index cost matrix distance function that can be defined in a different ways. For example dist( ) can be a squared Euclidian distance function. In this case the problem (Equation6)-(Equation7) becomes an unconstrained quadratic optimization problem $$\sum_{i_1=1}^{M_1} \ldots \sum_{i_N=1}^{M_N} (d_{i_1 i_2} + \ldots + d_{i_{N-1} i_N} - c_{i_1 \ldots i_N})^2 \to \min. \quad \text{(Equation 8)}$$

The problem (Equation8) can be solved using various general convex unconstrained optimization methods. Here let $d_{i_1 i_2}^*, \ldots, d_{i_{N} i_{N-1}}^*$, $i_l \in \{1, \ldots, M_l\}$, $l \in \{1, \ldots, N\}$ be a solution of mentioned above problem (Equation8). Then consider the multi-index assignment problem consisting of an initial system of constraints (Equation2)-(Equation5) and new criteria $$\sum_{i_1=1}^{M_1} \ldots \sum_{i_N=1}^{M_N} (d_{i_1 i_2}^* + \ldots + d_{i_{N-1} i_N}^*) x_{i_1 \ldots i_N} \to \min. \quad \text{(Equation 9)}$$

The solution of the new multi-index assignment problem with decomposable cost functions (Equation2)-(Equation5), (Equation9) can be obtained by using the previously discussed reduction to min-cost flow problem, and will be a feasible solution for the initial multi-index assignment problem (Equation1)-(Equation5). This approach gives a following efficient heuristic algorithm for solving multi-index assignment problems.

Algorithm: Heuristic algorithm for NP-hard multi-index axial assignment problem Input: Multi-index axial assignment problem (Equation1)-(Equation5).

Step 1: Construct a corresponding multi-index cost matrix approximation problem (Equation6)-(Equation7). Let $d_{i_1 i_2}^*, \ldots, d_{i_N i_{N-1}}^*$, $i_l \in \{1, \ldots, M_l\}$, $l \in \{1, \ldots, N\}$ be optimal solution of problem (Equation6)-(Equation7).

Step 2: Construct a corresponding multi-index assignment problem with decomposable cost function (Equation2)-(Equation5), (Equation9). Solve problem (Equation2)-(Equation5), (Equation9) using reduction to min-cost flow algorithm. Let $x_{i_1 \ldots i_N}^*$, $i_l \in \{1, \ldots, M_l\}$, $l \in \{1, \ldots, N\}$ be optimal solution of problem (Equation2)-(Equation5), (Equation9).

Output: $x_{i_1 \ldots i_N}^*$, $i_l \in \{1, \ldots, M_l\}$, $l \in \{1, \ldots, N\}$ is an approximation solution of the multi-index axial assignment problem (Equation1)-(Equation5).

Implementation Remarks:

Performance optimization: For performance optimization purposes, we can use the following approaches:

1: a greedy strategy for high confidence matching,
2: a parallel implementation of min-cost flow algorithm,
3: matching within fixed size time-window, We can reduce the dimension of the multi-index assignment problem by making high confidence matching using a greedy strategy when such matching is not ambiguous. Existing parallel implementations of the min cost flow algorithm (used on step 2 of the heuristic algorithm for multi-index assignment problem above) make it possible to increase the performance on higher performance computers, such as various modern multi-core processor platforms and the like.

Another strategy for performance optimization is solving the assignment problem within a fixed size time-window. Among the various indexes of the multi-index assignment problem, there is an index that corresponds to discreet time moments. By setting the system software to consider a fixed-size time window we (the processor) can process only observations within this time-window, which significantly reduces the dimension of multi-index assignment problem.

Tracks postponed identification: Some indexes of multi-index assignment problem represent observations obtained by various sensors (e.g. video cameras, RFID scanners). Here again, the positions of the features may be calculated using the real-world scene coordinates.

As before, RFID tags associated with the object can be considered as additional features of the object, and this RFID tag data (obtained from RFID tag reader sensors) can be used for resolving any conflicts which may not be resolved using video-based features obtained from video camera sensors.

In contrast to the video data, the system can generally assume that RFID-based features will uniquely identify an object of interest (e.g. using an RFID tag identification code); however relative to video, the exact position and velocity of an RFID tagged object will often be lower.

Due to this fact, in the case of conflicts and ambiguity, as previously discussed, the system can automatically postpone object and actor track identification until it gets sufficient position information (from either the RFID sensors or video sensors). For each of the time moments "T" where track identification is postponed, this track identification can be implemented by considering matching time-windows with the center in T. This approach allows the system to consider the possibility of using future observations for resolving any conflicts at time T. By allowing the system to variably delay the exact time in which object or actor tracks are identified, the system thus allows conflicts to be resolved with a very high degree of confidence. Among other factors, the time length of the delay may depend on ambiguity level of the conflict.

Handling Errors in Video Tracking:

Computer vision algorithms used to track actors (such as people) in video sensor data can make mistakes. This is especially true if actors (people) come close together, and/or the video resolution is not sufficient to segment objects or video data noise/artifacts.

To cope with this type of problem, in some embodiments of the invention, the system software may operate according to a new concept here termed a "Metaperson" or "Metaactor" concept.

Here a "metaperson" (metaactor) represents all of the possible actors (e.g. persons) paths on the scene, as calculated from sensor data of the actors various paths. The metaperson/metaactor thus contains all possible and feasible hypotheses regarding actors (e.g. people) and their paths. When a new actor (person) position is received, the algorithm decides if a new metaperson/metaactor should be created or not. Generally the system software can be configured to create a new metaperson/metaactor when another actor (e.g. person) is found in close proximity to the scene.

Figure 12:
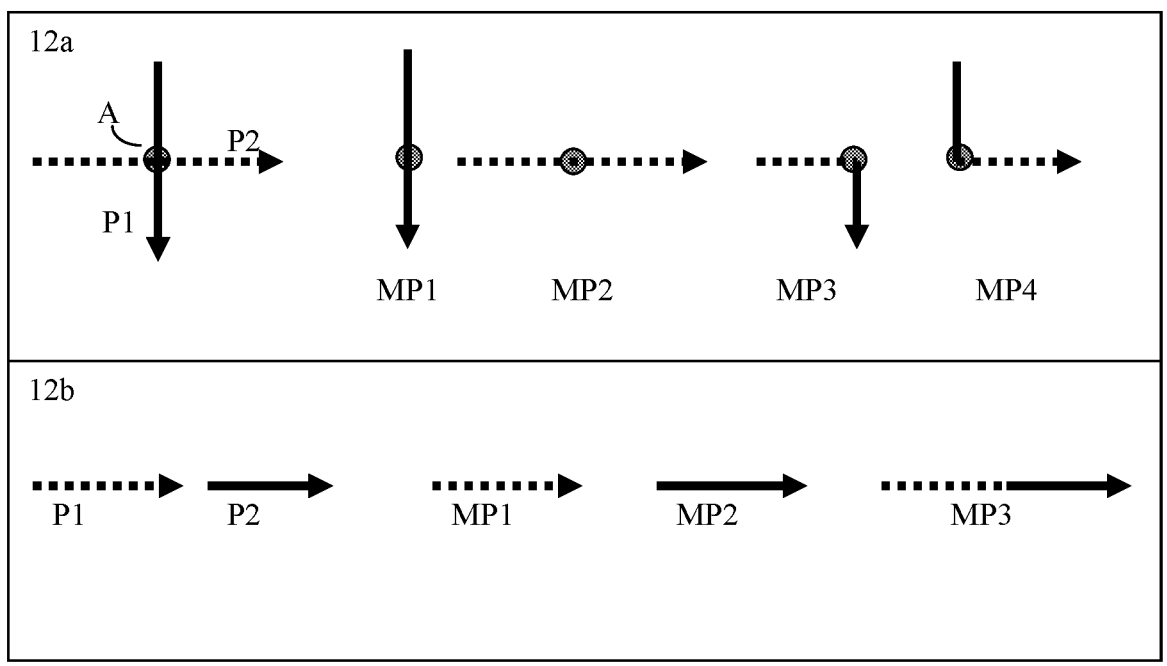
FIG. 12 shows an example of how the invention's "metaperson" or "metaactor" concepts can operate to cope with ambiguities in actor location and paths by first considering a set of all likely actor paths, and then further narrowing down the actor's likely "true" path once additional information is obtained by the system.

For example, consider FIG. 12 case 12a and 12b.

Case 12a shows two actors (here people P1 and P2) with paths crossing at point A. Here video sensor data can easily get confused—which actor is which? After the two actor's paths cross, automated video analytics algorithms are likely to incorrectly swap each actor's (person's) identification codes, and assign incorrect paths to the two actors after the crossing.

The invention's metapersons/metaactors creation algorithm operates by creating all possible paths or trajectories: MP1, MP2, MP3 and MP4. This ensures that the set of hypotheses of trajectories contains, at least as a subset, the true paths of the actors (people) P1 and P2. Which subset is actually correct can be automatically resolved later after the system has gathered more data.

Case 12b represents a different situation where the video sensors may have temporarily not been able to track a particular actor (person) for several seconds. Here again, the invention's metaperson/metaactor creation algorithm operates by creating various alternative paths. The system can consider the possibility both that there were two actors (persons) being tracked (e.g. M1 and M2), or alternatively that only just one actor (person) M3 was being tracked, but was temporarily lost by the video sensors.

Computing path correlations between actors (e.g. persons) and either tagged objects or tagged actors.

In some embodiments, the system may be configured to use a hierarchical/multi-resolution weighted approach to computing the correlation or similarity between the paths of two objects such as those of an actor (e.g. person) and that of a tag (which can be located on either an object or an actor). The approach is recursive in nature and goes as follows:

First the system calculates the [start point, end point] path segment similarity between the two ambiguous paths. This path segment similarity can be computed, for example by comparing the direction of the vector and the ratio of the length of the path segments over a given period of time.

Alternatively, the path segment similarity can be computed by determining the "area-of-mismatch" between the two path curves. Here "area-of-mismatch" denotes the area of the polygon formed when the two corresponding points of the path segments are made to coincide.

This path segment similarity is then assigned a weight factor which depends on the deviation of the true (e.g. sensor observed) path from the straight-line segment approximation. For example, if the true path was an exact straight line (thus exactly overlapping the straight-line segment approximation), then the system can assign a very high weight factor to this particular path segment similarity.

Having thus computed the weighted segment similarity, the system can now split the segments in two, and calculate the similarity for both parts. The total similarity is then the weighted average of segments' similarities. This can then be used to help resolve path ambiguities.

Bluetooth® is a trademark of the Bluetooth SIG.

The invention claimed is:

1. A method of automatically estimating locations of a plurality of different objects that are capable of being moved by a plurality of different actors, said method comprising:
using a set of first sensors and at least one processor to track and store in memory approximate paths over time of said plurality of different actors, thereby determining actor path data, wherein said set of first sensors comprise a set of video sensors;
using said at least one processor and computer vision algorithms to determine the approximate paths over time of said plurality of different actors;
using a set of second sensors and said at least one processor to track and store in memory approximate locations over time of said plurality of different objects, thereby determining object location over time data;
wherein said first sensors and said second sensors need not be the same types of sensors, and at least said set of second sensors is only able to approximately determine the locations over time of said plurality of different objects;
using said at least one processor to use both said actor path data and said object location over time data to determine if the location of a given object and the path of a given actor from the approximate paths of said plurality of different actors correlate over time, thereby determining at least one tentative association probability between said given object and said given actor;
wherein the probability that an object, once moved by an actor, remains associated with said actor, is less than or equal to 1, and changing a tentative association probability between an object and an actor is assigned at least one penalty cost parameter;
using said at least one processor, said actor path data, said object location over time data, said at least one tentative association probability between said given object and said given actor, and said at least one penalty cost parameter to determine the at least one of a probable location of said given object at one or more times and the association probability between said given object and said given actor at one or more times,
determining that the at least one of the probable location of said given object at one or more times and the association probability between said given object and said given actor at one or more times is outside a threshold that comprises a combination of preset object location and preset actor location; and
generating an alert notification in response to determining that the at least one of the probable location of said given object at one or more times and the association probability between said given object and said given actor at one or more times is outside the threshold.

2. The method of claim 1, further used to determine which various different objects are likely to be associated with a given actor;
using said at least one processor to further determine, for said given actor, at least one conflict resolution time when a sum of the association probabilities between said given objects and said given actor is at a local maximum value;

and reporting, for said given actor, at least the various different objects associated with said actor at said conflict resolution time.

3. The method of claim 1, wherein at least some of said actors are further tagged with a unique ID wireless device carried by said actors, further using a set of third wireless device sensors and said at least one processor to associate said unique ID with at least some of said actors; and further using said at least one processor to determine association probability between said given object and said given actor at one or more times, wherein said given actor is also associated with said unique ID.

4. The method of claim 3, further using said at least one processor to determine identity or demographic information pertaining to said given actor associated with said unique ID; and storing said association probability between said given object and said identity or demographic information pertaining to said given actor associated with said unique ID in a computer database.

5. The method of claim 3, wherein said unique ID wireless device is a Smartphone, and wherein said unique ID is supplied by at least one of an app running on said Smartphone;

or wherein said Smartphone additionally comprises a WiFi transceiver with a WiFi address, and said unique ID is supplied by said Smartphone's WiFi address;

or wherein said Smartphone additionally comprises a Bluetooth transceiver with a Bluetooth address, and unique ID is supplied by said Smartphone's Bluetooth address.

6. The method of claim 1, wherein said different objects are tagged with RFID tags, and said set of second sensors comprise a set of RFID sensors;

or wherein said second sensors comprise wireless devices carried by said actors.

7. The method of claim 1, wherein said actors are selected from the group consisting of people, vehicles, robots, and shopping carts.

8. The method of claim 1, wherein said objects are selected from the group consisting of products, badges, tags, inventory, merchandise, and vehicles.

9. The method of claim 1, wherein using said at least one processor to use both said actor path data and said object location over time data to determine if the location of a given object and the path of a given actor correlate over time, thereby determining at least one tentative association probability between said given object and said given actor further comprises the steps of:

using said at least one processor to minimize noise induced errors by combining and filtering data from at least some second sensors in said set of second sensors;

using said at least one processor to determine if the location of a given object and the path of a given actor correlate over time by computing likely proximity between said given object and said path of said given actor over a plurality of time points;

using said at least one processor to compute a likely track of said given object over said plurality of time points, and compute if said likely track of said given object over time correlates with said path of said given actor over said plurality of time points.

10. A method of automatically estimating locations of a plurality of different objects that are capable of being moved by a plurality of different actors, said method comprising:

using a set of first sensors and at least one processor to track and store in memory approximate paths over time of said plurality of different actors, thereby determining actor path data;

wherein said set of first sensors comprise a set of video sensors; and further using said at least one processor and computer vision algorithms to determine the approximate paths over time of said plurality of different actors;

using a set of second sensors and said at least one processor to track and store in memory approximate locations over time of said plurality of different objects, thereby determining object location over time data;

wherein said different objects are tagged with RFID tags, and said set of second sensors comprise a set of RFID sensors;

wherein said first sensors and said second sensors need not be the same types of sensors, and at least said set of second sensors is only able to approximately determine the locations over time of said plurality of different objects;

using said at least one processor to use both said actor path data and said object location over time data to determine if the location of a given object and the path of a given actor correlate over time, thereby determining at least one tentative association probability between said given object and said given actor;

wherein using said at least one processor to use both said actor path data and said object location over time data to determine if the location of a given object and the path of a given actor correlate over time, thereby determining at least one tentative association probability between said given object and said given actor further comprises the steps of:

using said at least one processor to minimize noise induced errors by combining and filtering data from at least some second sensors in said set of second sensors;

using said at least one processor to determine if the location of a given object and the path of a given actor correlate over time by computing likely proximity between said given object and said path of said given actor over a plurality of time points;

using said at least one processor to compute a likely track of said given object over said plurality of time points, and compute if said likely track of said given object over time correlates with said path of said given actor over said plurality of time points;

wherein the probability that an object, once moved by an actor, remains associated with said actor, is less than or equal to 1, and changing a tentative association probability between an object and an actor is assigned at least one penalty cost parameter; and using said at least one processor, said actor path data, said object location over time data, said at least one tentative association probability between said given object and said given actor, and said at least one penalty cost parameter to determine the at least one of a probable location of said given object at one or more times and the association probability between said given object and said given actor at one or more times.

11. The method of claim 10, further used to determine which various different objects are likely to be associated with a given actor;

using said at least one processor to further determine, for said given actor, at least one conflict resolution time when a sum of the association probabilities between said given objects and said given actor is at a local maximum value;
and reporting, for said given actor, at least the various different objects associated with said actor at said conflict resolution time.

12. The method of claim 10, wherein at least some of said actors are further tagged with a unique ID wireless device carried by said actors, further using a set of third wireless device sensors and said at least one processor to associate said unique ID with at least some of said actors; and
further using said at least one processor to determine association probability between said given object and said given actor at one or more times, wherein said given actor is also associated with said unique ID.

13. The method of claim 12, further using said at least one processor to determine identity or demographic information pertaining to said given actor associated with said unique ID; and
storing said association probability between said given object and said identity or demographic information pertaining to said given actor associated with said unique ID in a computer database.

14. The method of claim 12, wherein said unique ID wireless device is a Smartphone, and wherein said unique ID is supplied by at least one of an app running on said Smartphone;
or
wherein said Smartphone additionally comprises a WiFi transceiver with a WiFi address, and said unique ID is supplied by said Smartphone's WiFi address;
or
wherein said Smartphone additionally comprises a Bluetooth transceiver with a Bluetooth address, and unique ID is supplied by said Smartphone's Bluetooth address.

15. The method of claim 10, wherein said actors are selected from the group consisting of people, vehicles, robots, and shopping carts.

16. The method of claim 10, wherein said objects are selected from the group consisting of products, badges, tags, inventory, merchandise, and vehicles.

17. A method of automatically estimating locations of a plurality of different objects that are capable of being moved by a plurality of different actors, said method comprising:
using a set of first sensors and at least one processor to track and store in memory approximate paths over time of said plurality of different actors, thereby determining actor path data;
wherein said set of first sensors comprise a set of video sensors; and
further using said at least one processor and computer vision algorithms to determine the approximate paths over time of said plurality of different actors;
using a set of second sensors and said at least one processor to track and store in memory approximate locations over time of said plurality of different objects, thereby determining object location over time data;
wherein said different objects are tagged with RFID tags, and said set of second sensors comprise a set of RFID sensors;
wherein at least some of said actors are further tagged with a unique ID wireless device carried by said actors, further using a set of third wireless device sensors and said at least one processor to associate said unique ID with at least some of said actors; and
wherein said unique ID wireless device is a Smartphone, and wherein said unique ID is supplied by at least one of an app running on said Smartphone;
or
wherein said Smartphone additionally comprises a WiFi transceiver with a WiFi address, and said unique ID is supplied by said Smartphone's WiFi address;
or
wherein said Smartphone additionally comprises a Bluetooth transceiver with a Bluetooth address, and unique ID is supplied by said Smartphone's Bluetooth address;
wherein said first sensors and said second sensors need not be the same types of sensors, and at least said set of second sensors is only able to approximately determine the locations over time of said plurality of different objects;
using said at least one processor to use both said actor path data and said object location over time data to determine if the location of a given object and the path of a given actor correlate over time, thereby determining at least one tentative association probability between said given object and said given actor;
wherein using said at least one processor to use both said actor path data and said object location over time data to determine if the location of a given object and the path of a given actor correlate over time, thereby determining at least one tentative association probability between said given object and said given actor further comprises the steps of:
using said at least one processor to minimize noise induced errors by combining and filtering data from at least some second sensors in said set of second sensors;
using said at least one processor to determine if the location of a given object and the path of a given actor correlate over time by computing likely proximity between said given object and said path of said given actor over a plurality of time points;
using said at least one processor to compute a likely track of said given object over said plurality of time points, and compute if said likely track of said given object over time correlates with said path of said given actor over said plurality of time points;
wherein the probability that an object, once moved by an actor, remains associated with said actor, is less than or equal to 1, and changing a tentative association probability between an object and an actor is assigned at least one penalty cost parameter; and
using said at least one processor, said actor path data, said object location over time data, said at least one tentative association probability between said given object and said given actor, and said at least one penalty cost parameter to determine the at least one of a probable location of said given object at one or more times and the association probability between said given object and said given actor at one or more times;
further using said at least one processor to determine association probability between said given object and said given actor at one or more times, wherein said given actor is also associated with said unique ID;
further using said at least one processor to determine identity or demographic information pertaining to said given actor associated with said unique ID; and
storing said association probability between said given object and said identity or demographic information pertaining to said given actor associated with said unique ID in a computer database.

18. The method of claim 17, further used to determine which various different objects are likely to be associated with a given actor;

using said at least one processor to further determine, for said given actor, at least one conflict resolution time when a sum of the association probabilities between said given objects and said given actor is at a local maximum value;

and reporting, for said given actor, at least the various different objects associated with said actor at said conflict resolution time.

19. The method of claim 17, wherein said actors are selected from the group consisting of people, vehicles, robots, and shopping carts; and wherein said objects are selected from the group consisting of products, badges, tags, inventory, merchandise, and vehicles.

* * * * *

UNITED STATES PATENT AND TRADEMARK OFFICE
CERTIFICATE OF CORRECTION

PATENT NO. : 10,641,604 B1
APPLICATION NO. : 15/606675
DATED : May 5, 2020
INVENTOR(S) : Nathan et al.

Page 1 of 1

It is certified that error appears in the above-identified patent and that said Letters Patent is hereby corrected as shown below:

On the Title Page

Item (72), in "Inventors", in Column 1, Line 3, delete "Nizhniy" and insert --Nizhny-- therefor Item (72), in "Inventors", in Column 1, Line 4, delete "Nizhniy" and insert --Nizhny-- therefor In the Claims In Column 26, Line 48, in Claim 1, delete "time," and insert --time;-- therefor Signed and Sealed this
Twenty-third Day of February, 2021

Drew Hirshfeld
*Performing the Functions and Duties of the
Under Secretary of Commerce for Intellectual Property and
Director of the United States Patent and Trademark Office*